(12) United States Patent
Yamazaki et al.

(10) Patent No.: US 12,450,776 B2
(45) Date of Patent: Oct. 21, 2025

(54) INFORMATION PROCESSING APPARATUS, INFORMATION PROCESSING METHOD, AND PROGRAM

(71) Applicant: Sony Group Corporation, Tokyo (JP)

(72) Inventors: Toshio Yamazaki, Tokyo (JP); Yasuhiro Sutou, Kanagawa (JP); Kentaro Doba, Tokyo (JP); Seungha Yang, Kanagawa (JP)

(73) Assignee: SONY GROUP CORPORATION, Tokyo (JP)

( * ) Notice: Subject to any disclaimer, the term of this patent is extended or adjusted under 35 U.S.C. 154(b) by 81 days.

(21) Appl. No.: 18/286,063

(22) PCT Filed: Jan. 13, 2022

(86) PCT No.: PCT/JP2022/000895
§ 371 (c)(1),
(2) Date: Oct. 6, 2023

(87) PCT Pub. No.: WO2022/219862
PCT Pub. Date: Oct. 20, 2022

(65) Prior Publication Data
US 2024/0378751 A1 Nov. 14, 2024

(30) Foreign Application Priority Data
Apr. 15, 2021 (JP) .................... 2021-069074

(51) Int. Cl.
*G06T 7/80* (2017.01)
*G06V 10/44* (2022.01)

(52) U.S. Cl.
CPC .............. *G06T 7/80* (2017.01); *G06V 10/44* (2022.01)

(58) Field of Classification Search
CPC .... G06T 7/73; G06T 7/74; G06T 7/80; G06T 7/85; G06T 2207/20228; H04N 17/002;
(Continued)

(56) References Cited

U.S. PATENT DOCUMENTS 9,734,419 B1 * 8/2017 Ye ............................ G06T 7/85
10,096,114 B1 * 10/2018 Lasenby ................. G06T 7/246
(Continued)

FOREIGN PATENT DOCUMENTS

CN 110838148 A 2/2020
JP 2014-101075 A 6/2014
(Continued)

OTHER PUBLICATIONS

Xiao Tan et al: "Feature Correspondence with Even Distribution", Digital Image Computing Techniques and Applications (DICTA) ,2012 International Conference On, IEEE,Dec. 3, 2012 (Dec. 3, 2012), pp. 1-7, XP032310838,DOI: 10.1109/DICTA.2012.6411723 ISBN: 978-1-4673-2180-8 *abstract w* *pp. 1,4-p. 5*.

*Primary Examiner* — Brian P Yenke
(74) *Attorney, Agent, or Firm* — Paratus Law Group, PLLC

(57) ABSTRACT

A novel and improved information processing method, information processing apparatus, and program is proposed which can execute a calibration process with higher accuracy. The information processing apparatus includes: a detection unit configured to detect a feature point from each of images obtained by imaging a subject with a plurality of cameras respectively at a certain timing; and a processing unit configured to execute a process of calibrating at least one of the plurality of cameras by use of the cameras' respective images having the feature point detected by the detection unit, the feature point satisfying a predetermined condition.

17 Claims, 14 Drawing Sheets

(58) Field of Classification Search
CPC ......... H04N 13/246; H04N 2013/0081; G06V 10/44
See application file for complete search history.

(56) References Cited

U.S. PATENT DOCUMENTS

| | | | | |
|---|---|---|---|---|
| 10,097,812 | B2* | 10/2018 | Livyatan | G06F 18/22 |
| 10,917,593 | B2* | 2/2021 | Sakano | G06T 7/80 |
| 10,970,877 | B2* | 4/2021 | Eshima | G06T 7/74 |
| 11,178,382 | B1* | 11/2021 | Wang | H04N 13/246 |
| 2013/0083993 | A1* | 4/2013 | Sutou | G06T 7/97 |
| | | | | 382/154 |
| 2013/0135439 | A1* | 5/2013 | Kakuko | H04N 13/00 |
| | | | | 348/46 |
| 2016/0275683 | A1* | 9/2016 | Sakano | H04N 7/181 |
| 2018/0007345 | A1 | 1/2018 | Bougnoux | |
| 2018/0322658 | A1* | 11/2018 | Wang | H04N 13/246 |
| 2018/0350107 | A1* | 12/2018 | Myokan | H04N 23/64 |
| 2019/0037205 | A1* | 1/2019 | Itoh | G02B 7/023 |
| 2019/0347822 | A1* | 11/2019 | Nash | G06T 7/73 |
| 2020/0034989 | A1* | 1/2020 | Koyama | H04N 17/002 |
| 2021/0001776 | A1* | 1/2021 | Kim | B60R 1/002 |
| 2021/0327091 | A1* | 10/2021 | Park | G06T 7/85 |
| 2022/0101549 | A1* | 3/2022 | Sadeghi | G06T 7/596 |
| 2022/0132092 | A1* | 4/2022 | Shibata | H04N 13/25 |
| 2022/0210388 | A1* | 6/2022 | Ren | H04N 13/128 |
| 2023/0141515 | A1* | 5/2023 | Danziger | H04N 13/122 |
| | | | | 348/47 |
| 2024/0107001 | A1* | 3/2024 | Bai | H04N 17/002 |
| 2024/0202974 | A1* | 6/2024 | Doba | G06V 10/44 |

FOREIGN PATENT DOCUMENTS

| | | |
|---|---|---|
| JP | 2014-138332 A | 7/2014 |
| JP | 2017-116321 A | 6/2017 |
| JP | 2018-112522 A | 7/2018 |

* cited by examiner

INFORMATION PROCESSING APPARATUS, INFORMATION PROCESSING METHOD, AND PROGRAM

CROSS REFERENCE TO PRIOR APPLICATION

This application is a National Stage Patent Application of PCT International Patent Application No. PCT/JP2022/000895 (filed on Jan. 13, 2022) under 35 U.S.C. § 371, which claims priority to Japanese Patent Application No. 2021-069074 (filed on Apr. 15, 2021), which are all hereby incorporated by reference in their entirety.

TECHNICAL FIELD

The present disclosure relates to an information processing apparatus, an information processing method, and a program.

BACKGROUND ART

In recent years, a technology has been developed which uses each of images obtained by being captured by a plurality of cameras respectively for the purpose of analysis such as distance measurement. As described above, in order to use each of images obtained by being captured by a plurality of cameras respectively for analysis such as distance measurement, intrinsic parameters and extrinsic parameters of the plurality of cameras need to be more accurate, and a calibration process that obtains the intrinsic and extrinsic parameters of the plurality of cameras need to be executed with higher accuracy.

For example, Patent Document 1 discloses a technology for executing the calibration process on the basis of feature points included in each of images obtained by being captured by a plurality of cameras, and a linear travel distance of a moving body, before and after the moving body moves linearly.

CITATION LIST

Patent Document

Patent Document 1: Japanese Patent Application Laid-Open No. 2014-101075

SUMMARY OF THE INVENTION

Problems to be Solved by the Invention

However, in the technology described in Patent Document 1, the feature points used in the calibration process depend on the input image. Therefore, there is a possibility that the accuracy of the camera parameters calculated by the calibration process is reduced according to, for example, the imaging environment or the subject to be imaged.

As a result, the present disclosure proposes a novel and improved information processing method, information processing apparatus, and program that can execute a calibration process with higher accuracy.

Solutions to Problems

According to the present disclosure, an information processing apparatus is provided which includes: a detection unit configured to detect a feature point from each of images obtained by imaging a subject with a plurality of cameras respectively at a certain timing; and a processing unit configured to execute a process of calibrating at least one of the plurality of cameras by use of the cameras' respective images having the feature point detected by the detection unit, the feature point satisfying a predetermined condition.

Furthermore, according to the present disclosure, an information processing method to be executed by a computer is provided which includes: detecting a feature point from each of images obtained by imaging a subject with a plurality of cameras respectively at a certain timing; and executing a process of calibrating at least one of the plurality of cameras by use of the cameras' respective images having the detected feature point that satisfies a predetermined condition.

Furthermore, according to the present disclosure, a program is provided which causes a computer to realize: a detection function of detecting a feature point from each of images obtained by imaging a subject with a plurality of cameras respectively at a certain timing; and a processing function of executing a process of calibrating at least one of the plurality of cameras by use of the cameras' respective images having the feature point detected by the detection function, the feature point satisfying a predetermined condition.

MODE FOR CARRYING OUT THE INVENTION

A preferred embodiment of the present disclosure is described in detail hereinafter with reference to the accompanying drawings. Note that, in the description and the drawings, the same reference signs are assigned to components having substantially the same functional configurations, and redundant descriptions are omitted.

Furthermore, the "mode for carrying out the invention" is described according to the order of items listed below:
 1. Outline of Information Processing System
 2. Functional Configuration Example of Information Processing Apparatus 10
 3. Examples of Operation Processing of Information Processing Apparatus 10
 3.1. Entire Operation
 3.2. Image Processing
 3.3. Detection of Feature Points by Harris' Method
 3.4. Distinguishing of Pair of Feature Points
 3.5. Determination about Whether or Not Images Are Suitable for Calibration Process
 4. Modifications
 4.1. First Modification
 4.2. Second Modification
 4.3. Third Modification
 4.4. Fourth Modification
 4.5. Fifth Modification
 5. Examples of Operations and Effects
 6. Hardware Configuration Example
 7. Supplement <<1. Outline of Information Processing System>>

In a case where a plurality of cameras is used for, for example, distance measurement, object detection, or analysis, it is necessary to more accurately set the extrinsic and intrinsic parameters of each of the plurality of cameras. However, there is a case where the extrinsic and intrinsic parameters set for each of the cameras are displaced due to the influence of, for example, disturbance and aged deterioration.

Such displaced extrinsic and intrinsic parameters need to be updated to more accurate parameters by a calibration process of obtaining extrinsic and intrinsic parameters. Note that the extrinsic parameters include the location and orientation of the camera. Furthermore, the intrinsic parameters include the focal length, the optical center, and the lens' distorted shape. Furthermore, in the following description, there is a case where the extrinsic and intrinsic parameters are collectively expressed as the camera parameter.

Furthermore, in the following description, unless otherwise specified, there is a case where the calibration process of obtaining the camera parameter and a process of updating the camera parameter of a plurality of cameras to the camera parameter obtained by the calibration process are collectively expressed as the calibration process.

Hereinafter, as an embodiment of the present disclosure, an example of the calibration of an information processing system, is explained that detects a feature point from each of images obtained by imaging a subject with a plurality of cameras respectively at a certain timing, and executes a process of calibrating at least one of the plurality of cameras by use of the images having the feature point that satisfies a predetermined condition.

Figure 1A:
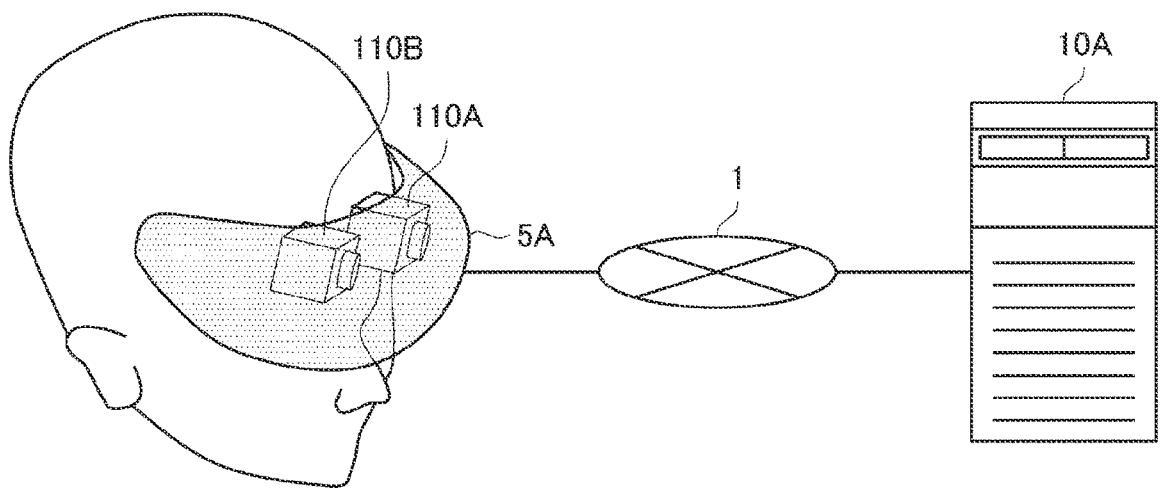
FIG. 1A is an explanatory diagram explaining an example of an information processing system according to the present disclosure.

FIG. 1A is an explanatory diagram explaining an example of the information processing system according to the present disclosure. As illustrated in FIG. 1A, the information processing system according to the present disclosure includes a network 1, a head mounted display (HMD) 5A, and a server 10A.

(Network 1)

The network 1 is a wired or wireless transmission line for information that is transmitted from an apparatus connected to the network 1. For example, the network 1 may include public line networks such as the Internet, a telephone line network, and a satellite communication network, and various local area networks (LANs) including Ethernet (registered trademark) and a wide area network (WAN). Furthermore, the network 1 may include a dedicated line network such as an Internet protocol-virtual private network (IP-VPN).

Furthermore, the HMD 5A and the server 10A are connected via the network 1.

(HMD5A)

The HMD 5A is an example of a moving body according to the present disclosure, and includes a left camera 110A and a right camera 110B. The HMD 5A is, for example, a head mounted display to which an application such as virtual reality (VR) or augmented reality (AR) is applied.

(Server 10A)

The server 10A is an example of an information processing apparatus according to the present disclosure, and detects feature points from images received by the left camera 110A and the right camera 110B from the HMD 5A. Furthermore, the server 10A executes a process of calibrating at least one of the left camera 110A or the right camera 110B by use of the cameras' respective images having feature points that satisfy a predetermined condition.

(Camera 110)

The left camera 110A and the right camera 110B are an example of the plurality of cameras according to the present disclosure, and acquire images by imaging the outside. Note that there is a case where images that are acquired by the left camera 110A and the right camera 110B respectively are expressed as the cameras' respective images.

Furthermore, there is a case where a display included in the HMD 5A displays a virtual object superimposed on a real object. For display of such a virtual object, a distance measuring technology using the left camera 110A and the right camera 110B is used.

Note that the information processing system that is configured in such a manner that a moving body 5 and an information processing apparatus 10 are separated from each other is described in FIG. 1A. However, in the information processing system of the present disclosure, the information processing apparatus 10 may be mounted on the HMD 5A.

Figure 1B:
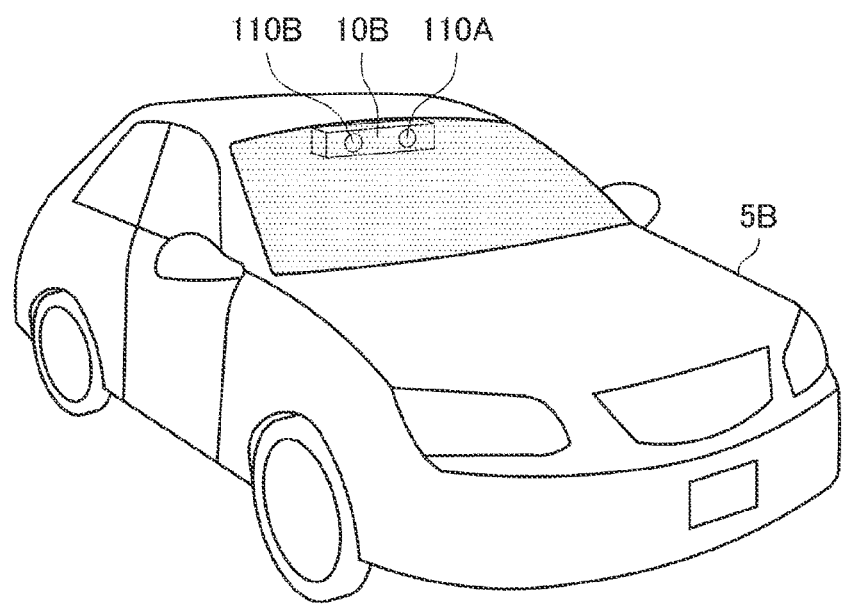
FIG. 1B is an explanatory diagram explaining another example of the information processing system according to the present disclosure.

FIG. 1B is an explanatory diagram explaining another example of the information processing system according to the present disclosure. As illustrated in FIG. 1B, the information processing system according to the present disclosure may include a vehicle 5B and an information processing device 10B.

(Vehicle 5B)

The vehicle 5B is an example of the moving body according to the present disclosure, and is a general vehicle in which a user rides. The information processing device 10B is mounted on the vehicle 5B according to the present disclosure as illustrated in FIG. 1B.

(Information Processing Device 10B)

The information processing device 10B is an example of the information processing apparatus according to the present disclosure. The information processing device 10B according to the present disclosure may include the left camera 110A and the right camera 110B. A functional overview of the information processing device 10B is similar to the description of the functional overview of the above-mentioned server 10A and therefore is omitted. Note that, in the following description, there is a case where the server 10A and the information processing device 10B are collectively expressed as the information processing apparatus 10.

Furthermore, the information processing device 10B according to the present disclosure may store images acquired by the left camera 110A and the right camera 110B, as a dashboard camera.

Furthermore, there is a case where the information processing device 10B according to the present disclosure detects, for example, a road, a person, or an object by use of images acquired by the left camera 110A and the right camera 110B, for use of, for example, automated driving. For detection of such a road, a person, an object, or the like, the distance measurement technology using the left camera 110A and the right camera 110B is used.

As described above, in the information processing apparatus 10 according to the present disclosure, the distance measurement technology is used in various scenes. However, the camera parameter of each of the plurality of cameras 110 needs to be more accurate in order to further increase the estimation accuracy of the distance between the plurality of cameras 110 and a subject.

On the other hand, also in a case where the camera parameter of the each of the plurality of cameras 110 is set at an accurate value at a certain timing, there is a possibility that accuracy is lost over time due to the influence of disturbance such as vibrations, and aged deterioration.

Therefore, there is a case where the camera parameter set in the plurality of cameras 110 needs to be calibrated as appropriate at the time of use by the calibration process that is executed by use of images obtained by being captured by the plurality of cameras 110.

On the other hand, images obtained by being captured by the plurality of cameras 110 are inputted to execute the calibration process of obtaining the camera parameter. Therefore, there is a possibility that the accuracy of the camera parameter to be outputted decreases depending on the input image.

As a result, the information processing apparatus 10 according to the present disclosure detects a feature point from each of images obtained by imaging a subject with the plurality of cameras respectively at a certain timing, and calibrates at least one of the plurality of cameras by use of the cameras' respective images having the feature point that satisfies a predetermined condition. A functional configuration example of the information processing apparatus 10 according to the present disclosure is described below with reference to FIG. 2.

<2. Functional Configuration Example of Information Processing Apparatus 10>

Figure 2:
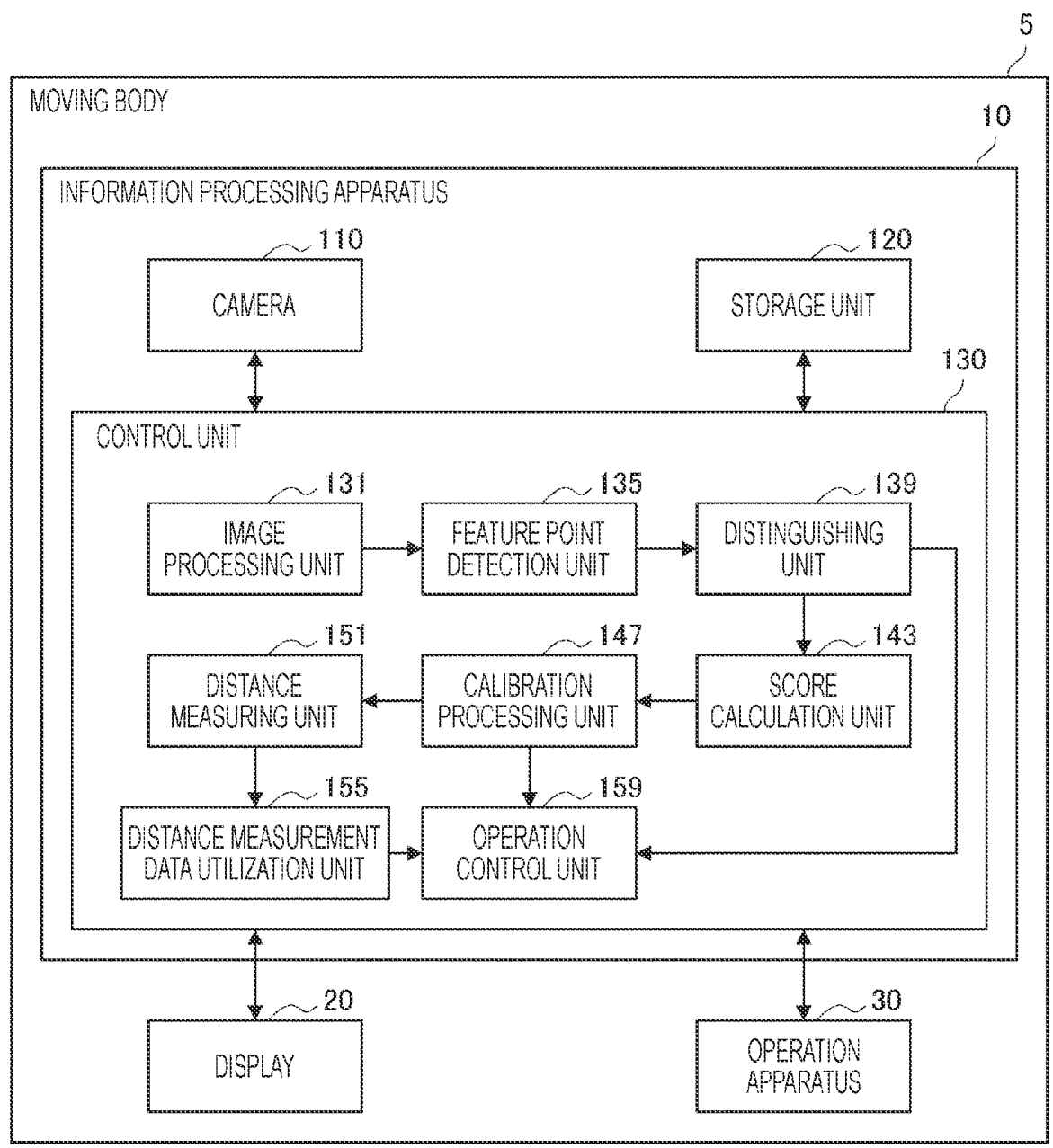
FIG. 2 is an explanatory diagram explaining a functional configuration example of an information processing apparatus 10 according to the present disclosure.

FIG. 2 is an explanatory diagram explaining a functional configuration example of the information processing apparatus 10 according to the present disclosure. As illustrated in FIG. 2, the information processing apparatus 10 according to the present disclosure includes the camera 110, a storage unit 120, and a control unit 130. Furthermore, the information processing apparatus 10 is mounted on the moving body 5.

The moving body 5 according to the present disclosure includes the information processing apparatus 10, a display 20, and an operation apparatus 30. The moving body 5 may be the above-mentioned HMD 5A or vehicle 5B. Furthermore, the moving body 5 may be, for example, a drone, a ship, or an aircraft.

(Display 20)

The display 20 has a function as a display unit that displays a target location to which the moving body 5 is guided to move.

The function of the display 20 as the display unit is realized by, for example, a cathode ray tube (CRT) display device, a liquid crystal display (LCD) device, or an organic light emitting diode (OLED) device.

Furthermore, the display 20 may have a function as an operation unit that selects permission to update the camera parameter.

The function of the display 20 as the operation unit is realized by, for example, a touch panel.

(Operation Apparatus 30)

The operation apparatus 30 is an apparatus that operates under control of an operation control unit 159 described below. A specific example of the operation apparatus 30 is described below.

{Camera 110}

The camera 110 images a subject and acquires an image thereof. In the present description, an example in which two cameras 110 are provided in the information processing apparatus 10 is mainly described. However, three or more cameras may be provided in the information processing apparatus 10.

{Storage Unit 120}

The storage unit 120 holds images obtained by being captured by the cameras 110. For example, the storage unit 120 may hold the cameras' respective images calculated and resulted in that a displacement between the plurality of cameras 110 is equal to or greater than a predetermined value on the basis of a rectification process executed by an image processing unit 131 described below.

{Control Unit 130}

The control unit 130 controls the overall operation of the information processing apparatus 10 according to the present disclosure. As illustrated in FIG. 2, the control unit 130 according to the present disclosure includes the image processing unit 131, a feature point detection unit 135, a distinguishing unit 139, a score calculation unit 143, a calibration processing unit 147, a distance measuring unit 151, a distance measurement data utilization unit 155, and an operation control unit 159.

The image processing unit 131 executes image processing on the cameras' respective images acquired by the plurality of cameras 110. For example, the image processing unit 131 executes various types of image processing such as shading correction and noise reduction on the cameras' respective images.

Furthermore, the image processing unit 131 executes various processes such as lens distortion removal, the rectification process, and a cropping process.

The feature point detection unit 135 is an example of a detection unit according to the present disclosure, and detects feature points from the cameras' respective images obtained by imaging a subject with the plurality of cameras at a certain timing.

For example, the feature point detection unit 135 may detect feature points from the cameras' respective images by use of a known technology such as Harris' method or scale invariant feature transform (SIFT). Note that, as an example of a method for the feature point detection unit 135 detecting feature points from images, a feature point detection method using Harris' method is described below.

The distinguishing unit 139 distinguishes, as a pair of feature points, each of feature points included in one image detected by the feature point detection unit 135, and a feature point having the highest correlation with the each of feature points among feature points included in the other image.

For example, the distinguishing unit 139 distinguishes, as a pair of feature points, each of feature points included in an image obtained by being captured by the left camera 110A, and a feature point having the highest correlation with the each of feature points among feature points included in an image obtained by being captured by the right camera 110B.

The score calculation unit 143 calculates a score value indicating the degree to which the cameras' respective images obtained by imaging a subject with the plurality of cameras 110 at a certain timing are suitable for the calibration process.

For example, the score calculation unit 143 may calculate the distribution of disparity values each obtained per pair of feature points distinguished by the distinguishing unit 139, as a score value. Note that in the following description, there is a case where the score value based on the distribution of disparity values is expressed as a disparity distribution score.

Furthermore, the score calculation unit 143 may calculate, as a score value, the distribution of feature points distinguished as a pair of feature points by the distinguishing unit 139. Note that in the following description, there is a case where the score value based on the distribution of feature points distinguished as a pair of feature points is expressed as a feature point distribution score.

The calibration processing unit 147 is an example of a processing unit according to the present disclosure, and executes the process of calibrating at least one of the plurality of cameras 110 by use of images suitable for the calibration process among the cameras' respective images obtained by being captured by the plurality of cameras 110.

For example, the calibration processing unit 147 executes the calibration process of calculating the camera parameter of the plurality of cameras 110 by use of images suitable for the calibration process. Furthermore, the calibration processing unit 147 may execute a process of updating the camera parameter of the plurality of cameras 110. Details regarding the images suitable for the calibration process are described below.

Furthermore, the calibration processing unit 147 is an example of a calculation unit according to the present disclosure, and may calculate a displacement between the plurality of cameras on the basis of a relationship between image positions of a pair of feature points. Furthermore, the calibration processing unit 147 may determine whether or not an error has occurred in the plurality of cameras on the basis of the displacement between the plurality of cameras.

The distance measuring unit 151 executes a distance measurement process of calculating the distance from the plurality of cameras 110 to the subject on the basis of the images captured by the plurality of cameras 110 and the camera parameter. The distance measurement process according to the present disclosure may use a known technology such as the principle of triangulation. An example of a method for calculating the distance from the plurality of cameras 110 to a subject being an imaging target by use of the principle of triangulation is described below with reference to FIG. 3.

Figure 3:
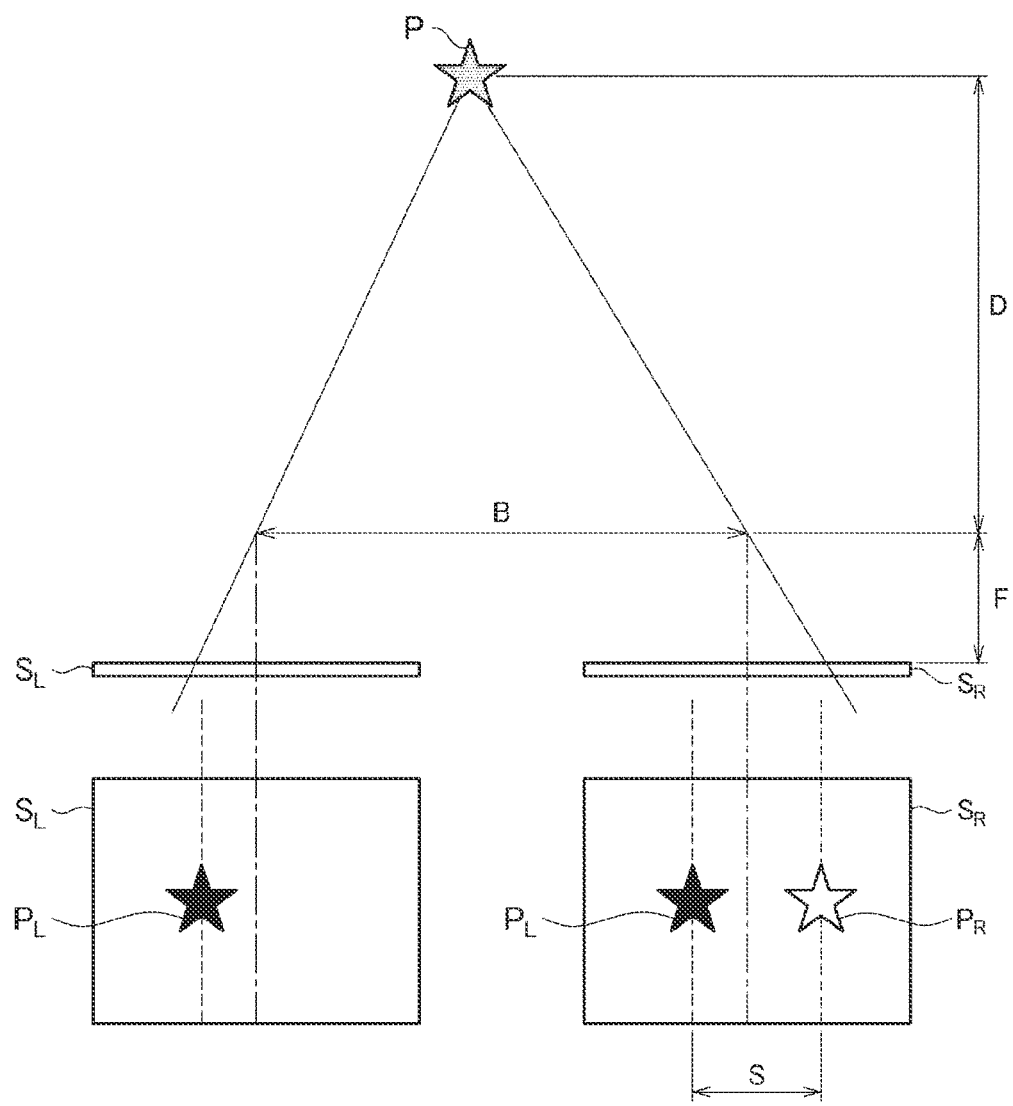
FIG. 3 is an explanatory diagram explaining an example of a distance measurement process using the principle of triangulation.

FIG. 3 is an explanatory diagram explaining an example of the distance measurement process using the principle of triangulation. FIG. 3 illustrates image positions of a subject P on an image plane $S_L$ of the left camera 110A and on an image plane $S_R$ of the right camera 110B in a case where the subject P is imaged with the left camera 110A and the right camera 110B.

An image position $P_L$ is a position where the subject P is imaged on the image plane $S_L$ of the left camera 110A in a case where the left camera 110A images the subject P. Furthermore, an image position $P_R$ is a position where the subject P is imaged on the image plane $S_R$ of the right camera 110B in a case where the right camera 110B images the subject P at the same timing as the left camera 110A.

Furthermore, a difference between the image position $P_L$ of the subject P in the left camera 110A and the image position $P_R$ of the subject P in the right camera 110B is referred to as a disparity S.

Here, using a base length B, a focal length E, and the disparity S, a distance D is expressed by the following mathematical formula (Math. 1).

[Math. 1]

$$D = B \times \frac{F}{S} \qquad \text{(Math. 1)}$$

As described above, the distance measuring unit 151 can calculate the distance from the plurality of cameras 110 to the subject P by use of (Formula 1). The description is returned to the functional configuration example of the information processing apparatus 10 according to the present disclosure with reference to FIG. 2.

The distance measurement data utilization unit 155 uses the distance measurement information calculated by the distance measuring unit 151. For example, the distance measurement data utilization unit 155 may determine the possibility of collision between the moving body 5 on which the plurality of cameras 110 is mounted and the object on the basis of the calculated distance measurement information.

The operation control unit 159 controls the operation of the operation apparatus 30. For example, in a case where the distance measurement data utilization unit 155 determines that the possibility of collision between the moving body 5 and the subject is high, the operation control unit 159 may control the operation apparatus 30 (for example, an engine or a brake mechanism) related to collision avoidance.

Furthermore, the operation control unit 159 may control the operation apparatus 30 via a control device that controls the overall operation of the moving body 5.

Up to this point the functional configuration example of the information processing apparatus 10 according to the present disclosure has been described. Next, examples of operation processing of the information processing system according to the present disclosure are sequentially described with reference to FIGS. 4 to 9.

<3. Examples of Operation Processing of Information Processing Apparatus 10>

<<3.1. Entire Operation>>

Figure 4:
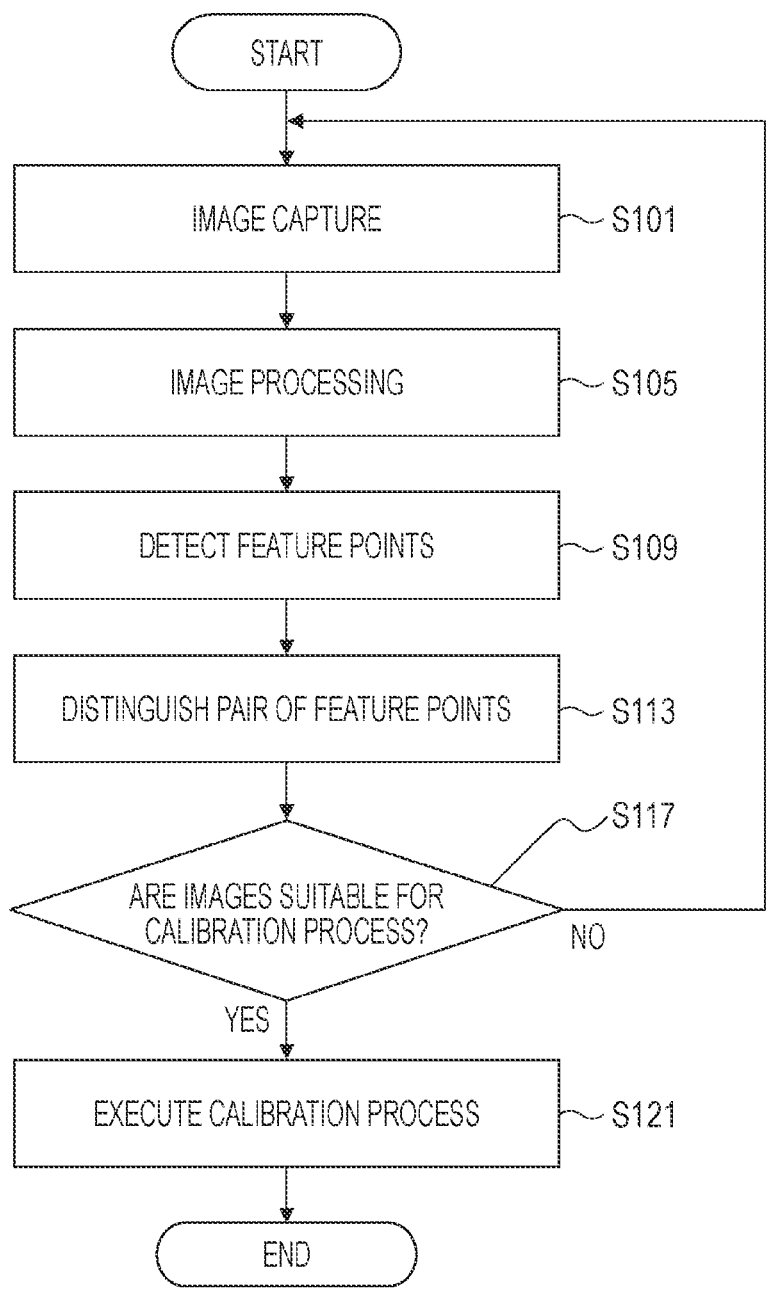
FIG. 4 is an explanatory diagram explaining an example of operation processing of the information processing apparatus 10 according to the present disclosure.

FIG. 4 is an explanatory diagram explaining an example of operation processing of the information processing apparatus 10 according to the present disclosure. First, the plurality of cameras 110 images a subject at a certain timing and each acquires an image thereof (S101).

Next, the image processing unit 131 executes image processing on the cameras' respective images obtained by being captured by the plurality of cameras 110 (S105).

Next, the feature point detection unit 135 detects feature points from the cameras' respective images (S109).

The distinguishing unit 139 then distinguishes a pair of feature points having a high correlation between each feature point detected from one image and each feature point detected from the other image (S113).

The calibration processing unit 117 then determines whether or not the cameras' respective images obtained by being captured by the plurality of cameras 110 are images suitable for the calibration process (S117). If it is determined that the images are suitable for the calibration process, the procedure moves on to S121 (S117/Yes), and if it is determined that the images are not suitable for the calibration process, the procedure moves on to S101 (S117/No).

In a case where it is determined that the images are suitable for the calibration process (S117/Yes), the calibration processing unit 117 executes the process of calibrating at least one of the plurality of cameras (S121), and the information processing apparatus 10 according to the present disclosure ends the procedure.

Up to this point the example of the entire operation processing of the information processing apparatus 10 according to the present disclosure has been described. Next, specific examples of operation processing related to S105 to S117 are sequentially described. First, an example of operation processing related to image processing according to the present disclosure is described with reference to FIG. 5.

<<3.2. Image Processing>>

Figure 5:
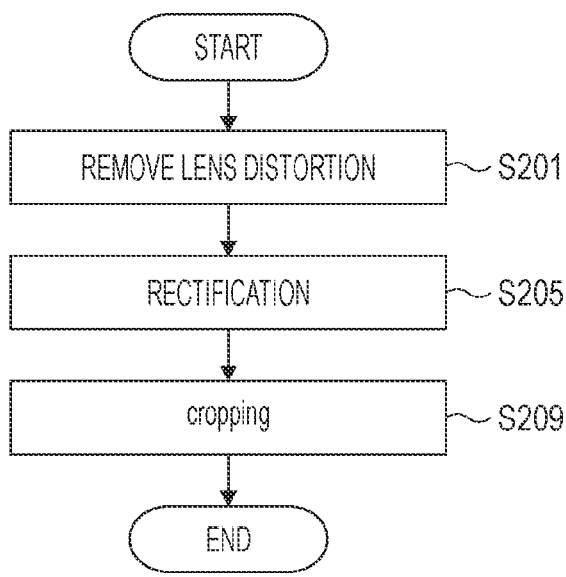
FIG. 5 is an explanatory diagram explaining an example of operation processing related to image processing.

FIG. 5 is an explanatory diagram explaining an example of operation processing related to image processing. First, the image processing unit 131 uses the camera parameter set in the plurality of cameras 110 to remove lens distortion in the cameras' respective images obtained by being captured by the plurality of cameras 110 (S201).

Next, the image processing unit 131 executes the rectification process on the cameras' respective images obtained by being captured by the plurality of cameras 110 (S205). Note that the rectification process is a process of aligning image positions of a certain subject in a y direction in the cameras' respective images obtained by imaging the subject with the plurality of cameras 110. Note that let a linear direction linking the centers of the plurality of cameras 110 mounted on the information processing apparatus 10 be an x direction, and let a direction perpendicular to the x direction be the y direction.

The image processing unit 131 then cuts the image that has undergone the lens distortion removal and the rectification process into a desired image size by the cropping process (S209), and the image processing unit 131 according to the present disclosure ends the procedure related to image processing.

Up to this point the operation processing example related to image processing according to the present disclosure has been described. Next, an example of operation processing related to detection of feature points according to the present disclosure is described with reference to FIG. 6.

<<3.3. Detection of Feature Points by Harris' Method>>

Figure 6:
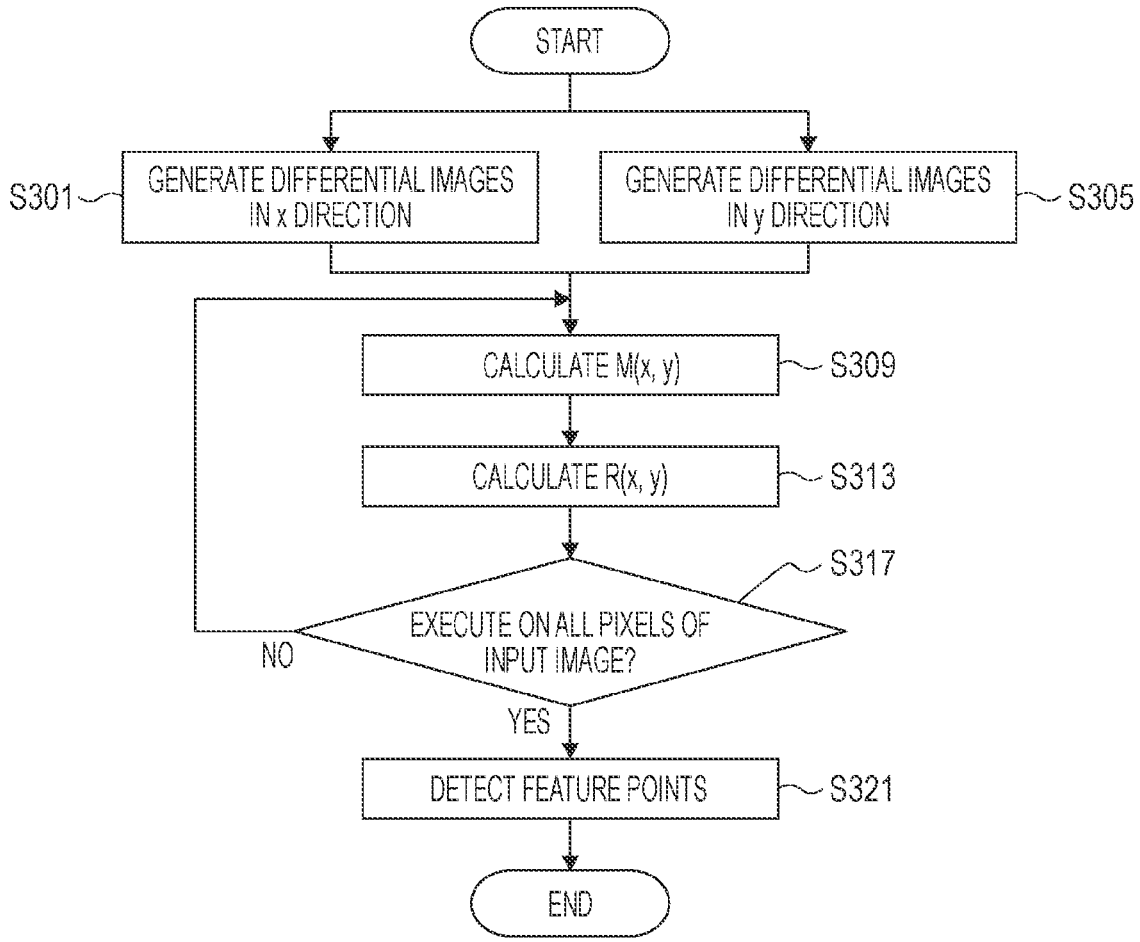
FIG. 6 is an explanatory diagram explaining an example of a method for detecting feature points by Harris' method.

FIG. 6 is an explanatory diagram explaining an example of a method for detecting feature points by Harris' method. First, the feature point detection unit 135 generates differential images in the x direction from the cameras' respective images that have been inputted (S301).

Furthermore, the feature point detection unit 135 generates differential images in the y direction from the cameras' respective images that have been inputted (S305). Note that the feature point detection unit 135 may generate differential images in the x direction and differential images in the y direction, for example, by applying the Sobel filter for the x direction and the y direction to the cameras' respective images that have been inputted.

The feature point detection unit 135 then calculates a matrix M(x, y) by a pixel value at the same pixel position in the differential image in each of the directions and the following mathematical formula (Math. 2) (S309).

[Math. 2]

$$M(x, y) = \sum_{u,v} g(u, v) \begin{bmatrix} I_x I_x & I_x I_y \\ I_x I_y & I_y I_y \end{bmatrix} \quad \text{(Math. 2)}$$

Note that g(u, v) is a weighting factor, and may be, for example, a Gaussian function with x, y as the origin. Furthermore, $I_x$ is a pixel value of the differential image in the x direction, and $I_y$ is a pixel value of the differential image in the y direction.

Next, the feature point detection unit 135 calculates a feature value R(x, y) of a pixel (x, y) by the matrix M(x, y) and the following mathematical formula (Math. 3) (S313).

[Math. 3]

$$R(x, y) = det M(x, y) - k(trM)^2 \quad \text{(Math. 3)}$$

Note that detM(x, y) is the value of the determinant of the matrix M(x, y), and trM is the trace of the matrix M(x, y). Furthermore, k is a parameter designated by a user, and is designated in a range of, for example, 0.04 to 0.06.

The feature point detection unit 135 then executes the procedure of S309 to S313 on all the pixels of the input image (S317). Hence, in a case where the procedure related to S309 to S313 has not been executed on all the pixels of the input image (S317/No), the procedure returns to S309, and in a case where the procedure related to S309 to S313 has been executed on all the pixels of the input image (S317/Yes), the procedure moves on to S321.

The feature point detection unit 135 then detects feature points on the basis of each of the feature values R(x, y) of all the pixels (S321).

For example, the feature point detection unit 135 detects, as a feature point (for example, a corner point) of the image, a position of a pixel having the maximum feature value R(x, y), the pixel being equal to or greater than a threshold designated by the user.

Up to this point the example of the method for detecting feature points by Harris' method has been described. Next, an example of a method for distinguishing a pair of feature values according to the present disclosure is described with reference to FIG. 7.

<<3.4. Distinguishing of Pair of Feature Points>

Figure 7:
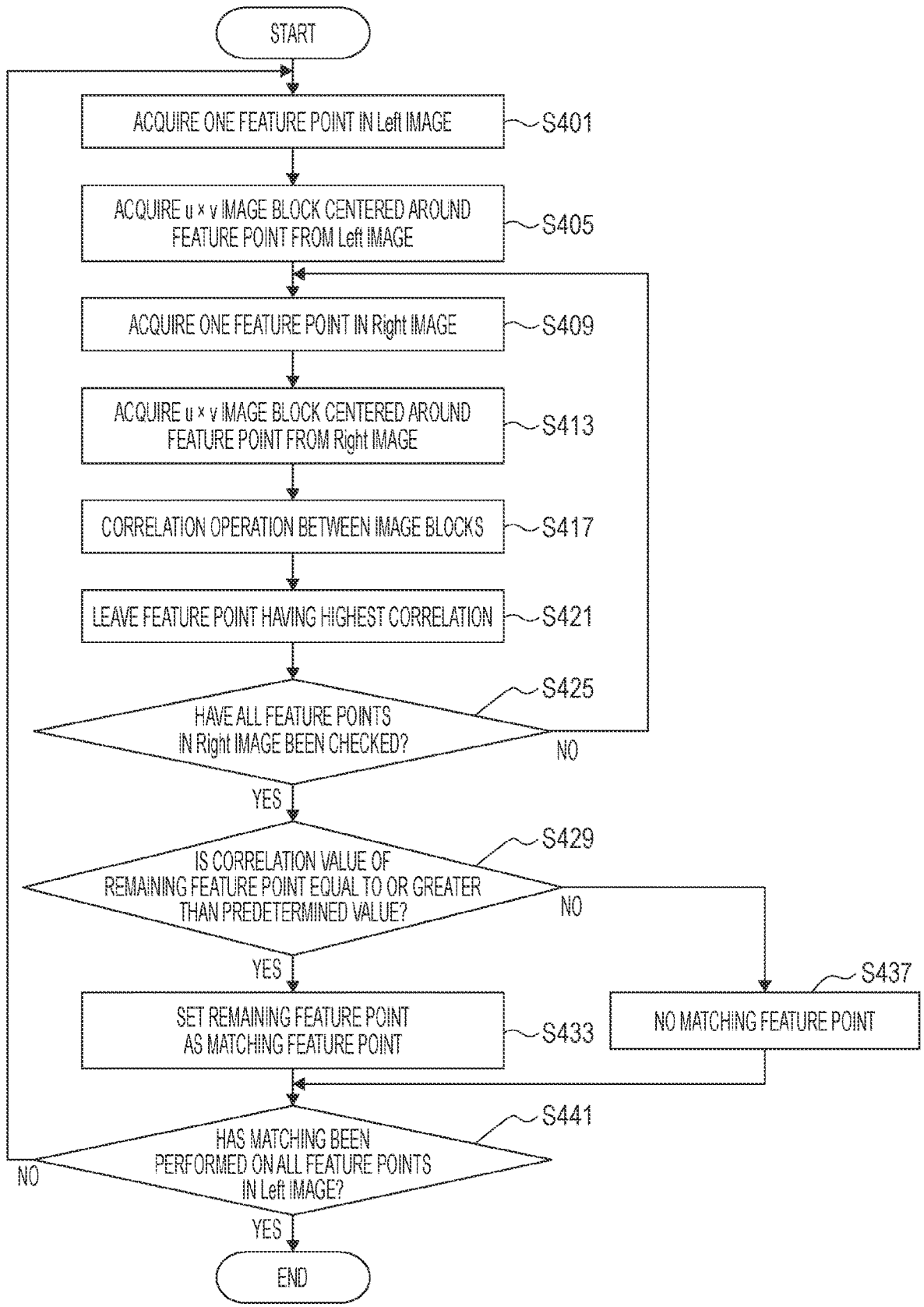
FIG. 7 is an explanatory diagram explaining an example of operation processing related to distinguishing of a pair of feature points according to the present disclosure.

FIG. 7 is an explanatory diagram explaining an example of operation processing related to distinguishing of a pair of feature points according to the present disclosure. In FIG. 7, an example of a method for the distinguishing unit 139 distinguishing a pair of feature points from feature points included in each of two images is described. In the following description, there is a case where, of the two images, an image obtained by being captured by the left camera 110A is expressed as the Left image, and an image obtained by being captured by the right camera 110B is expressed as the Right image.

First, the distinguishing unit 139 acquires one feature point of the Left image (S401).

Next, the distinguishing unit 139 acquires an image block of u×v set as the feature point from the Left image (S405).

The distinguishing unit 139 then acquires one feature point of the Right image (S409).

The distinguishing unit 139 then acquires an image block of u×v centered around the feature point from the Right image (S413).

Next, the distinguishing unit 139 performs a correlation operation between the image block of the Light side and the image block of the Right side (S417).

For example, in the correlation operation according to the present disclosure, the distinguishing unit 139 may calculate the degree of correlation of each feature point using a known computation method, but may calculate the degree of correlation of each feature point using any of, for example, the following mathematical formulae (Math. 4) to (Math. 7).

[Math. 4]
$$SSD(x_l, y_l, x_r, y_r) = \sum_{u,v}((I_l - I_r))^2 \quad \text{(Math. 4)}$$

[Math. 5]
$$SAD(x_l, y_l, x_r, y_r) = \sum_{u,v}(I_l - I_r)^2 \quad \text{(Math. 5)}$$

[Math. 6]
$$NCC(x_l, y_l, x_r, y_r) = \frac{\sum\sum((I_l I_r))}{\sqrt{\sum\sum I_l I_l}\sqrt{\sum\sum I_r I_r}} \quad \text{(Math. 6)}$$

[Math. 7]
$$NCC(x_l, y_l, x_r, y_r) = \frac{\sum\sum((I_l - AVE(I_l))(I_r - AVE(I_r)))}{\sqrt{\sum\sum(I_l - AVE(I_l))^2}\sqrt{\sum\sum(I_r - AVE(I_r))^2}} \quad \text{(Math. 7)}$$

Note that AVE in (Math. 7) represents an average value. Here, a specific example of the correlation operation according to the present disclosure is described with reference to FIG. 8.

Figure 8:
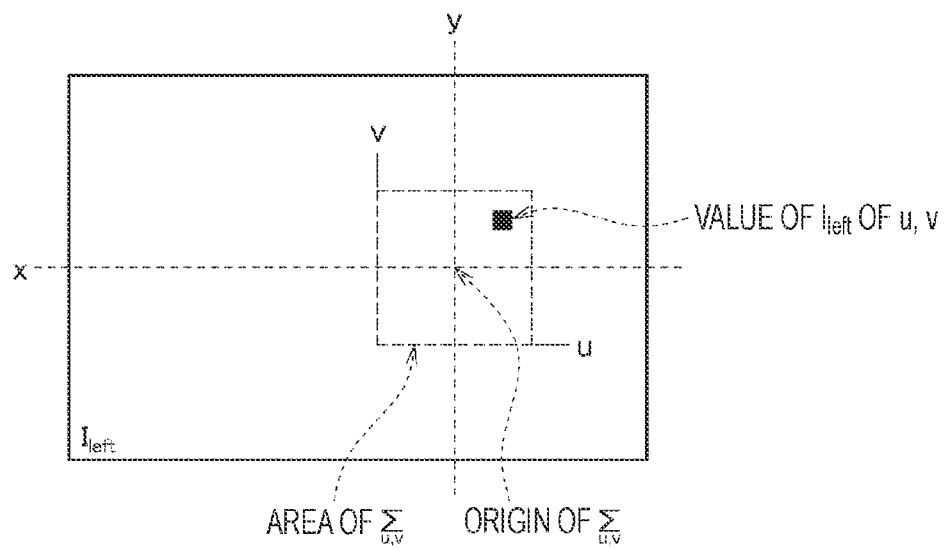
FIG. 8 is an explanatory diagram explaining a specific example of a correlation operation according to the present disclosure.

FIG. 8 is an explanatory diagram explaining a specific example of the correlation operation according to the present disclosure. The distinguishing unit 139 acquires pixel values in the area of the u×v block having the certain feature point of the Left image as the origin.

Then, the distinguishing unit 139 similarly acquires the area of the u×v block having the certain feature point as the origin also in the Right image.

The distinguishing unit 139 then calculates the degree of correlation of a feature point by applying the above-mentioned formulae 4 to 7 to each pixel value $I_{left}$ in the u×v area of the Left image and each pixel value $I_{Right}$ in the u×v area of the Right image.

Up to this point the specific example of the correlation operation according to the present disclosure has been described. Referring back to FIG. 7, the description of the example of the operation processing related to the distinguishing of a pair of feature points is continued.

After executing a correlation operation between the feature points in the Left image and the feature points in the Right image (S417), the distinguishing unit 139 leaves a feature point in the Right image, the feature point having the highest correlation with the feature point in the Left image acquired in S401, as a candidate for a pair of feature points (S421).

The distinguishing unit 139 then executes the procedure of S409 to S421 between the feature point in the Left image acquired in S401 and all feature points in the Right image (S425). Hence, in a case where all the feature points in the Right image have not been checked against the feature point in the Left image acquired in S401 (S425/No), the procedure returns to S409, and in a case where all the feature points in the Right image have been checked (S425/Yes), the procedure moves on to S429.

In the case where all the feature points in the Right image have been checked (S425/Yes), the distinguishing unit 139 determines whether or not a correlation value between the feature point in the Left image acquired in S401 and the last remaining feature point in the Right image in S421 is equal to or greater than a predetermined value (S429). In a case where the correlation value is less than the predetermined value (S429/No), the procedure moves on to S437, and in a case where the correlation value is equal to or greater than the predetermined value (S429/Yes), the procedure moves on to S433.

In the case where the correlation value is less than the predetermined value (S429/No), the distinguishing unit 139 determines that there is no feature point in the Right image, the no feature point matching the feature point in the Left image acquired in S401, as a pair of feature points (S437).

In the case where the correlation value is equal to or greater than the predetermined value (S429/Yes), the distinguishing unit 139 distinguishes the feature point in the Left image acquired in S401 and the last remaining feature point in the Right image in S421, as a pair of feature points (S433).

The distinguishing unit 139 then executes the processing related to the distinguishing of a pair of feature points in S401 to S437 on all feature points in the Left image (S441). Hence, in a case where the processing related to the distinguishing of a pair of feature points has not been executed on all the feature points in the Left image (S441/No), the procedure returns to S401, and in a case where processing related to matching has been executed on all the feature points in the Left image (S441/Yes), the distinguishing unit 139 according to the present disclosure ends the procedure.

Up to this point the example of the operation processing related to the distinguishing of a pair of feature points according to the present disclosure has been described. Next, an example of operation processing of determining whether or not each image is an image suitable for the calibration process on the basis of feature points and pairs of feature points is described with reference to FIG. 9.

<<3.5. Determination about Whether or not Images are Suitable for Calibration Process>>

In order to improve the accuracy of calculation of the camera parameter by the calibration process, it is necessary that a pair of feature points distinguished from the cameras' respective images indicate the same target position. Hence, as the number of feature points detected by the feature point detection unit 135 and the number of pairs of feature points distinguished by the distinguishing unit 139 increase, the influence of an error in the distinguishing of pairs of feature points can be reduced.

As a result, the calibration processing unit 147 distinguishes the cameras' respective images in which the detected feature point satisfies the predetermined condition, as images suitable for the calibration process.

Figure 9:
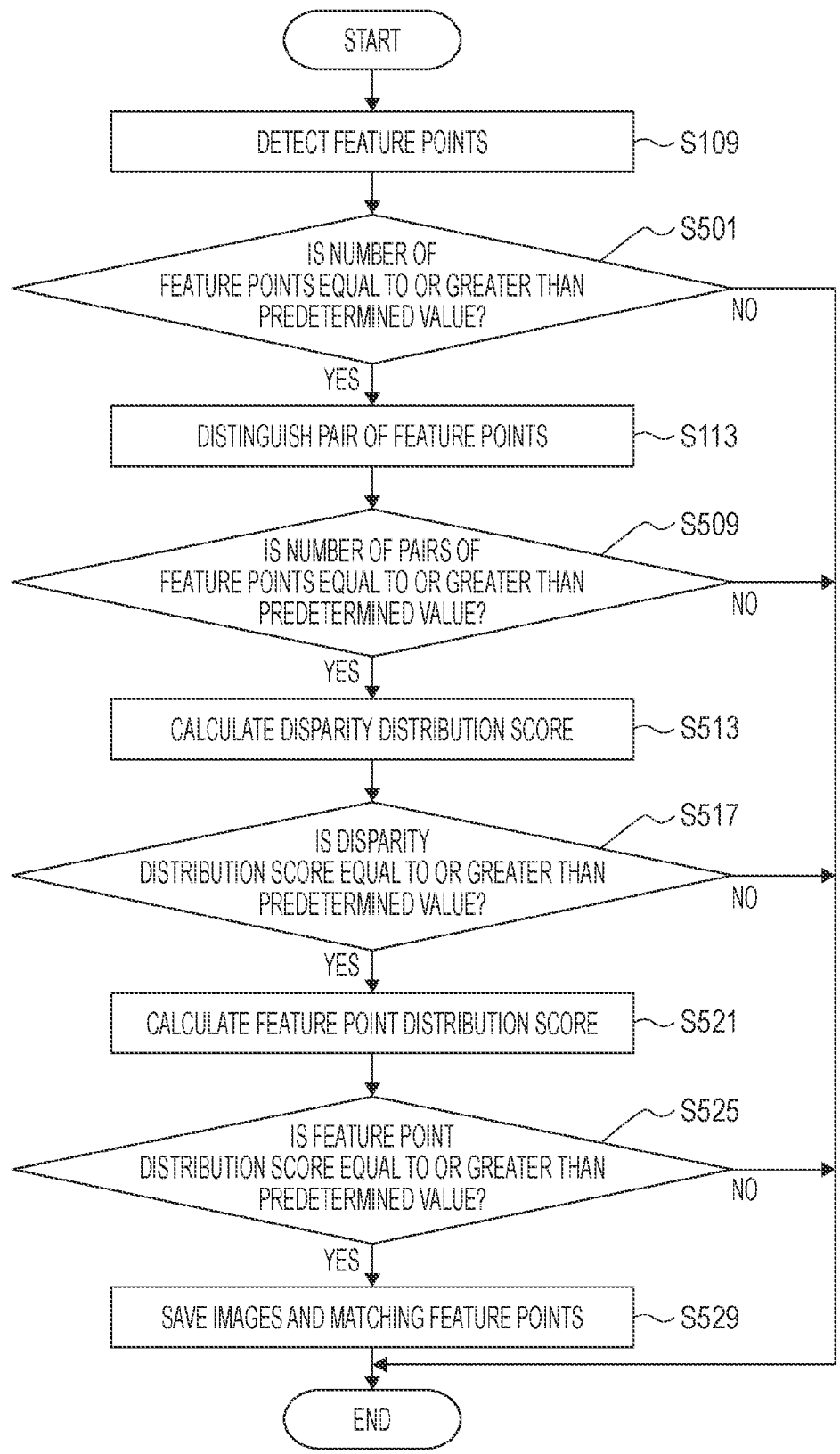
FIG. 9 is an explanatory diagram explaining an example of operation processing of determining whether or not images are suitable for a calibration process.

FIG. 9 is an explanatory diagram explaining an example of operation processing of determining whether or not images are suitable for the calibration process. First, the feature point detection unit 135 detects feature points from the cameras' respective images (S109).

Next, the calibration processing unit 147 determines whether or not the number of detected feature points is equal to or greater than a predetermined value (S501). In a case where the number of feature points is equal to or greater than the predetermined value (S501/Yes), the procedure moves on to S113. In a case where the number of feature points is less than the predetermined value (S501/No), the calibration processing unit 147 determines that each image in which feature points have been detected is an image that is not suitable for the calibration process, and ends the procedure.

In the case where the number of feature points is equal to or greater than the predetermined value (S501/Yes), the distinguishing unit 139 distinguishes pairs of feature points from the cameras' respective images (S113).

In a case where the number of pairs of feature points is equal to or greater than a predetermined value (S509/Yes), then the calibration processing unit 147 moves the procedure to S513. In a case where the number of pairs of feature points is less than the predetermined value (S509/No), the calibration processing unit 147 determines that each image in which feature points have been detected is an image that is not suitable for the calibration process, and ends the procedure.

In the case where the number of pairs of feature points is equal to or greater than the predetermined value (S509/Yes), the calibration processing unit 147 calculates a disparity distribution score (S513). Note that the disparity distribution score indicates the distribution of disparity values each per pair of feature points distinguished by the distinguishing unit 139. More specifically, as the standard deviation or variance of the disparity value of each of all pairs of feature points increases, the disparity distribution score indicates a higher value.

The calibration processing unit 147 then determines whether or not the disparity distribution score is equal to or greater than a predetermined value (S517). In a case where the disparity distribution score is equal to or greater than the predetermined value (S517/Yes), the procedure moves on to S521. In a case where the disparity distribution score is less than the predetermined value (S517/No), the calibration processing unit 147 determines that each image in which feature points have been detected is an image that is not suitable for the calibration process, and ends the procedure.

In the case where the disparity distribution score is equal to or greater than the predetermined value (S517/Yes), the calibration processing unit 147 calculates a feature point distribution score (S521). Note that the feature point distribution score indicates the distribution of feature points distinguished as pairs of feature points. More specifically, as the standard deviation or variance of the x and y coordinate values on the image plane of the feature points distinguished as pairs of feature points increases, the feature point distribution score indicates a higher value.

The calibration processing unit 147 then determines whether or not the feature point distribution score is equal to or greater than a predetermined value (S525). In a case where the feature point distribution score is equal to or greater than the predetermined value (S525/Yes), the procedure moves on to S529. In a case where the feature point distribution score is less than the predetermined value (S525/No), the calibration processing unit 147 determines that each image in which feature points have been detected is an image that is not suitable for the calibration process, and ends the procedure.

In the case where the feature point distribution score is equal to or greater than the predetermined value (S525/Yes), the calibration processing unit 147 determines that each image in which feature points have been detected is an image suitable for the calibration process, saves the each image and the feature points distinguished as the pairs of feature points (S529), and ends the procedure.

Up to this point the example of the operation processing of determining whether or not images are suitable for the calibration process according to the present disclosure has been described. However, the method for determining whether or not images are suitable for the calibration process according to the present disclosure is not limited to such an example.

For example, the calibration processing unit 147 may determine whether or not the cameras' respective images are images suitable for the calibration process, executing not all steps of S501, S509, S517, and S525 but at least one or more of the steps.

Up to this point the example of the operation processing of the information processing apparatus 10 according to the present disclosure has been described. However, the embodiment according to the present disclosure is not limited to such an example. Modifications according to the present disclosure are described below with reference to FIGS. 10 to 16.

<4. Modifications>

<<4.1. First Modification>>

In a case where no camera error based on the camera parameter has occurred, the calibration processing unit 147 does not necessarily need to execute the calibration process on the plurality of cameras 110. As a result, the information processing apparatus 10 according to the present disclosure may execute camera error determination subsequent to the determination about whether or not the cameras' respective images obtained by being captured by the plurality of cameras 110 are images suitable for the calibration process.

Figure 10:
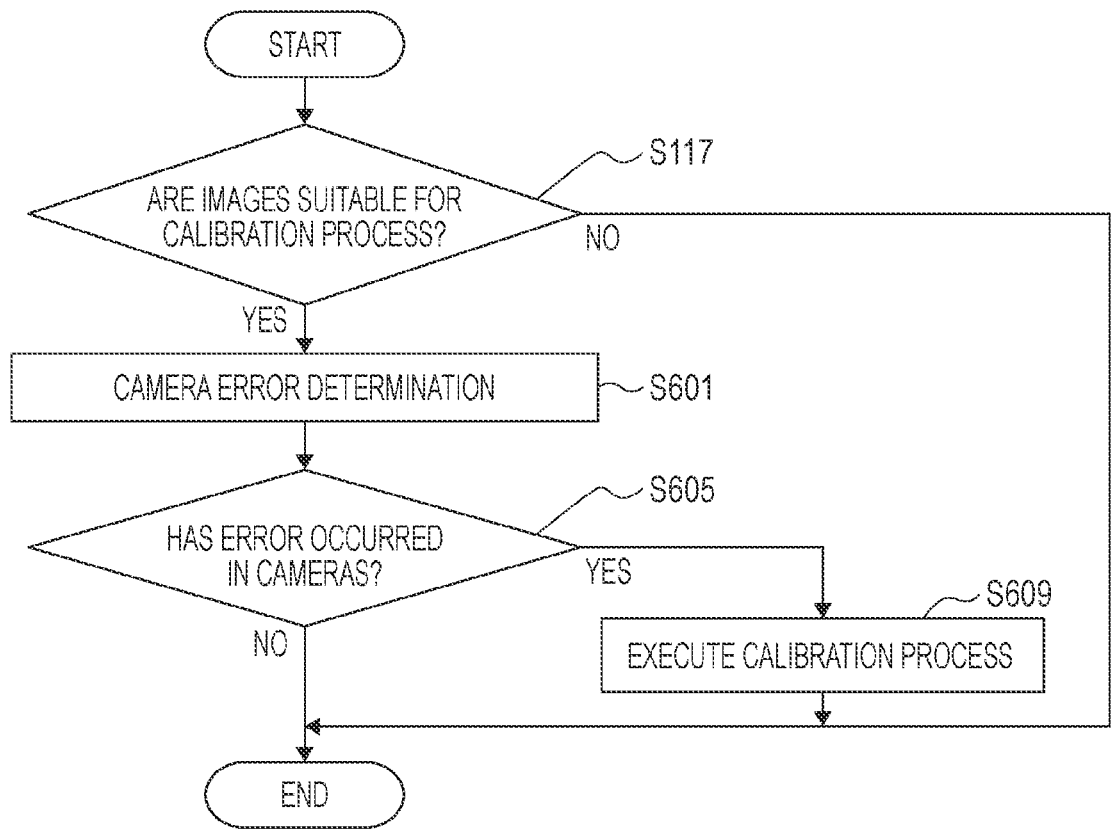
FIG. 10 is an explanatory diagram explaining an example of operation processing according to a first modification.

FIG. 10 is an explanatory diagram explaining an example of operation processing according to a first modification. First, the calibration processing unit 147 determines whether or not each image is an image suitable for the calibration process (S117). In a case where it is determined that the image is suitable for the calibration process (S117/Yes), the procedure moves on to S601, and in a case where it is determined that the image is not suitable for the calibration process (S117/No), the information processing apparatus 10 ends the procedure.

In the case where it is determined that the image is suitable for the calibration process (S117/Yes), the calibration processing unit 147 performs error determination on the plurality of cameras 110 (S601).

The calibration processing unit 147 then determines whether or not an error has occurred in the plurality of cameras 110 (S605). In a case where it is determined that an error has occurred in the plurality of cameras 110 (S605/Yes), the procedure moves on to S609, and in a case where it is determined that no error has occurred in the plurality of cameras 110 (S605/No), the information processing apparatus 10 ends the procedure.

In the case where it is determined that an error has occurred in the plurality of cameras 110 (S605/Yes), the calibration processing unit 147 executes the calibration process on at least one of the plurality of cameras 110 (S609), and the information processing apparatus 10 ends the procedure.

Note that the calibration processing unit 147 may perform error determination on the plurality of cameras 110 on the basis of, for example, the rectification process executed by the image processing unit 131. An example of the camera error determination based on the rectification process is described below with reference to FIG. 11.

Figure 11:
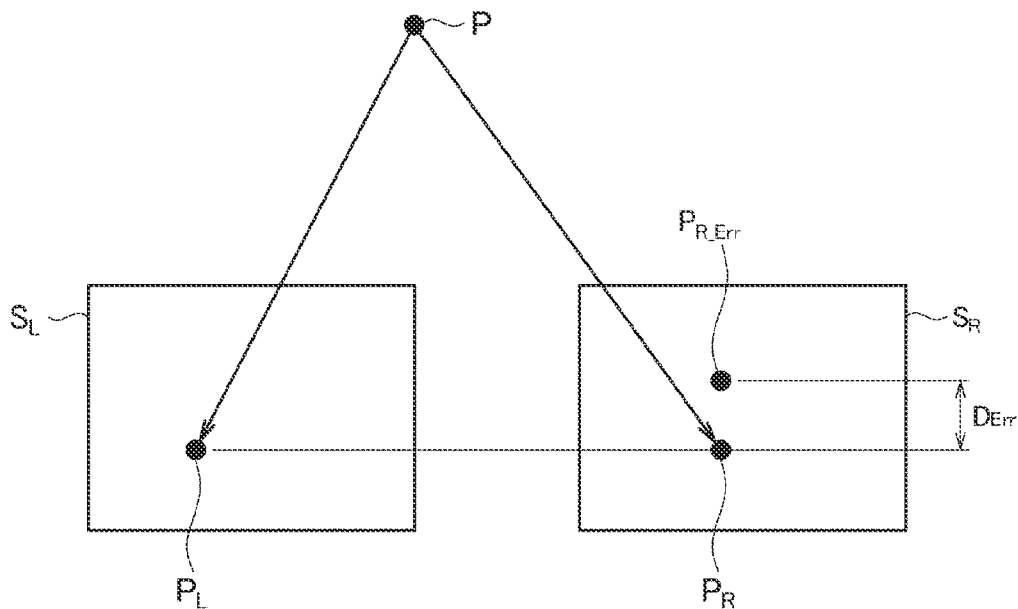
FIG. 11 is an explanatory diagram explaining a method for determining an error in cameras based on a rectification process.

FIG. 11 is an explanatory diagram explaining a method for determining an error in cameras based on the rectification process. In a case where the left camera 110A and the right camera 110B are used to image the subject P, whether or not there is a camera error may affect the image positions of the subject P after the rectification process.

For example, in a case where no error has occurred in the cameras, the image processing unit 131 executes the rectification process on each image, and then the image position $P_L$ on the image plane $S_L$ of the left camera 110A and the image position $P_R$ on the image plane $S_R$ of the right camera 110B are in the same y-coordinate position.

On the other hand, in a case where an error has occurred in the cameras, the image processing unit 131 executes the rectification process on each image, and then the image position $P_L$ on the image plane SL of the left camera 110A and an image position $P_{R\_ERR}$ on the image plane $S_R$ of the right camera 110B are in different y-coordinate positions.

Hence, the calibration processing unit 147 can determine whether or not a camera error has occurred, on the basis of the value of a difference $D_{ERR}$ between the image position $P_L$ on the image plane $S_L$ and the image position $P_{R\_ERR}$ on the image plane $S_R$ after the rectification process.

More specifically, the calibration processing unit 147 may determine that an error has occurred in the plurality of cameras 110 in a case where the difference $D_{ERR}$ is equal to or greater than a predetermined value, and may determine that no error has occurred in the plurality of cameras 110 in a case where the difference $D_{ERR}$ is less than the predetermined value. Note that the difference $D_{ERR}$ is an example of a displacement between the cameras.

Note that the possibility that a camera error occurs frequently is low, and therefore the calibration processing unit 147 may determine whether or not an error has occurred in the plurality of cameras 110 for the cameras' respective images obtained after a lapse of a certain period of time.

Furthermore, in a case where it is determined that an error has occurred in the plurality of cameras 110, the storage unit 120 may save the cameras' respective images used for the determination. Therefore, the calibration processing unit 147 can then control the timing to execute the calibration process, and can execute the calibration process at a safer timing while the moving body 5 is at rest or after touchdown.

Up to this point the example of the method for determining an error in cameras based on the rectification process has been described. Next, an example of operation processing of a second modification according to the present disclosure is described with reference to FIG. 12.

<<4.2. Second Modification>>

In the description up to this point, the example has been described in which the calibration processing unit 147 sets, as one pair, the cameras' respective images obtained by being captured by the plurality of cameras at a certain timing, and executes the calibration process by use of the one pair of the cameras' respective images. However, the information processing apparatus 10 according to the present disclosure may execute the calibration process by use of a plurality of the cameras' respective images.

Figure 12:
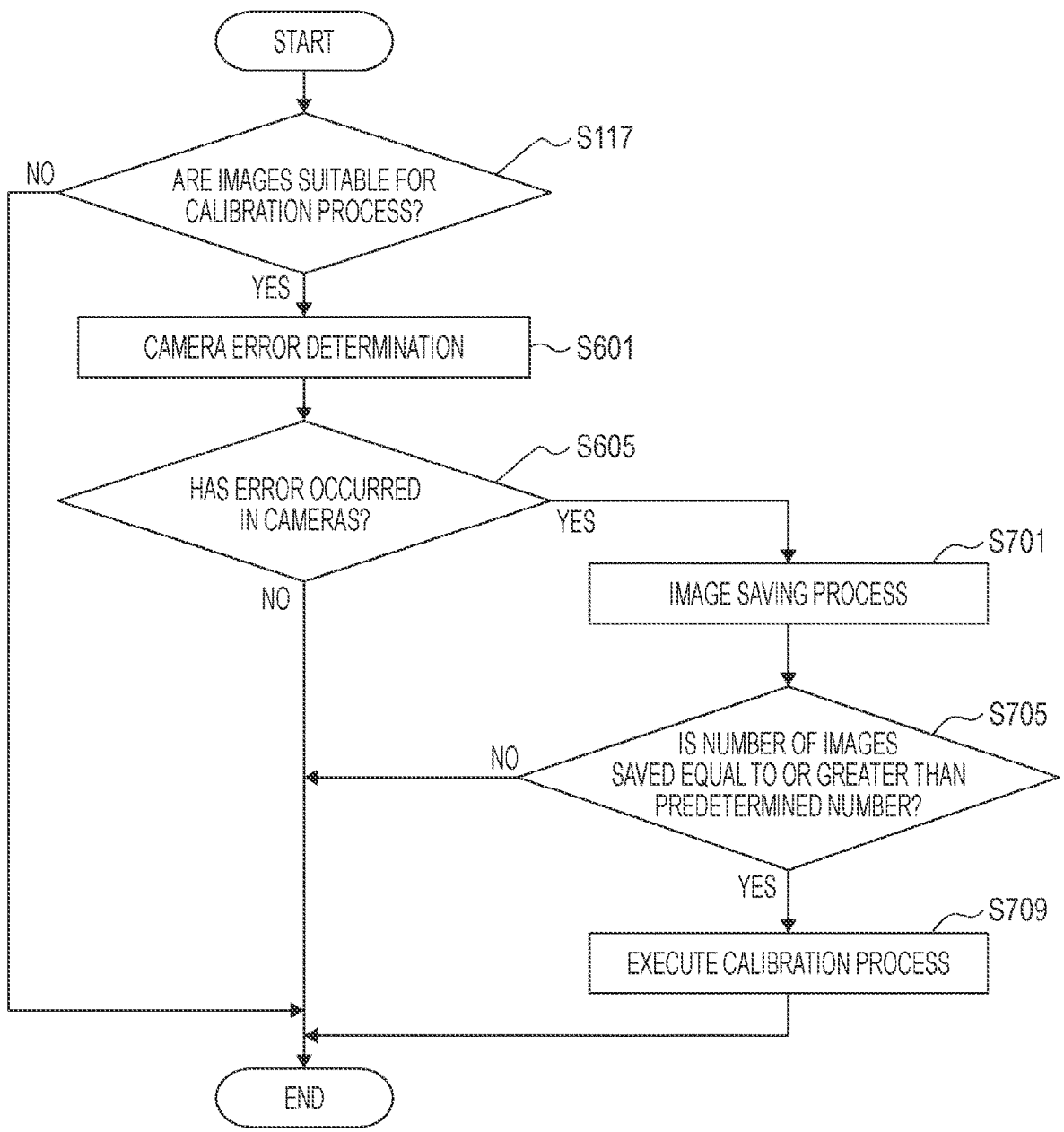
FIG. 12 is an explanatory diagram explaining an example of operation processing according to a second modification.

FIG. 12 is an explanatory diagram explaining an example of operation processing according to the second modification. The procedure of S117, S601, and S605 is described with reference to FIG. 10. Therefore, a description thereof is omitted in FIG. 12.

In a case where it is determined that an error has occurred in the plurality of cameras 110 (S605/Yes), the storage unit 120 saves the cameras' respective images determined to be suitable for the calibration process in S117 (S701).

The calibration processing unit 147 then determines whether or not the number of the cameras' respective images saved in the storage unit 120, or the number of pairs of the cameras' respective images, is equal to or greater than a predetermined number (S705). In a case where it is determined that the number is equal to or greater than the predetermined number (S705/Yes), the procedure moves on to S709, and in a case where it is determined that the number is less than the predetermined number (S705/No), the calibration processing unit 147 ends the procedure.

In the case where it is determined that the number is equal to or greater than the predetermined number (S705/Yes), the calibration processing unit 147 executes the process of calibrating at least one of the plurality of cameras 110 by use of the plurality of the cameras' respective images held in the storage unit 120, and ends the procedure.

Note that the calibration processing unit 147 may execute the calibration process by use of the predetermined number of the cameras' respective images having a new imaging time among the cameras' respective images held in the storage unit 120.

Furthermore, the storage unit 120 may regularly delete the cameras' respective images having an old imaging time. For example, the storage unit 120 may delete the cameras' respective images after a certain period of time passes since imaging times thereof, or may set an upper limit to the amount to hold the cameras' respective images and delete the cameras' respective images in ascending order of imaging times in a case where the upper limit is exceeded.

Up to this point the example of operation processing of the second modification according to the present disclosure has been described. Next, an example of operation processing of a third modification according to the present disclosure is described with reference to FIG. 13.

<<4.3. Third Modification>>

In the description up to this point, the calibration process has been described as the process including the calibration process of obtaining the camera parameter and the process of applying the camera parameter obtained by the calibration process to at least one of the plurality of cameras.

The calibration processing unit 147 according to the present disclosure may execute the calibration process using images suitable for the calibration process, and apply the camera parameter obtained by calibration to the plurality of cameras 110 in a case where a user' permission is obtained.

Figure 13:
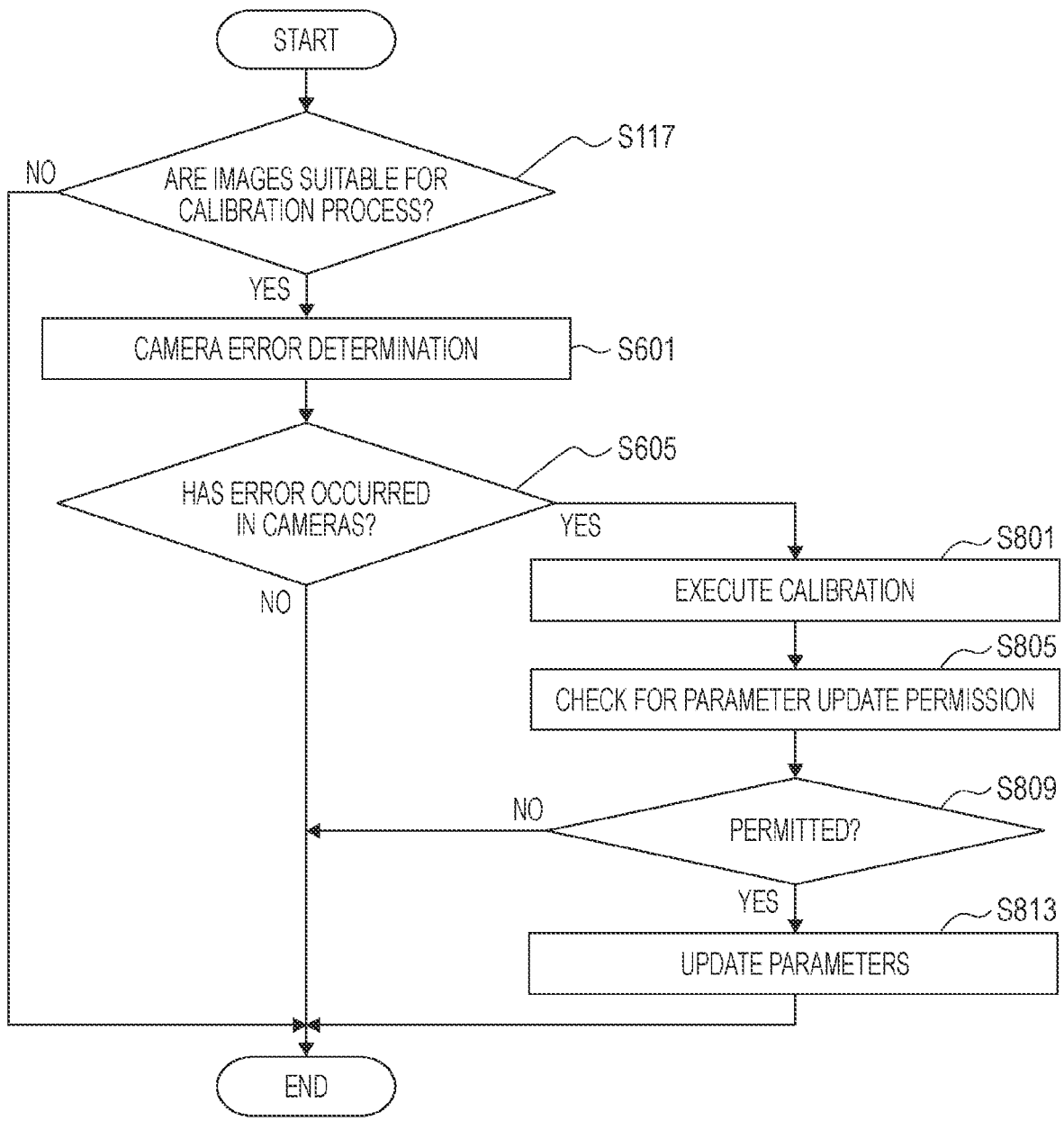
FIG. 13 is an explanatory diagram explaining an example of operation processing according to a third modification.

FIG. 13 is an explanatory diagram for explaining an example of operation processing according to the third modification. The procedure of S117, S601, and S605 is described with reference to FIG. 10. Therefore, a description thereof is omitted in FIG. 13.

In a case where it is determined that an error has occurred in the plurality of cameras 110 (S605/Yes), the calibration processing unit 147 executes calibration using the cameras' respective images determined to be suitable for the calibration process in S117, and calculates the camera parameter. (S801).

The information processing apparatus 10 then checks with the user for permission to update the camera parameter (S805).

The calibration processing unit 147 then determines whether or not the user has permitted the update of the camera parameter (S809). In a case where the update of the camera parameter has been permitted (S809/Yes), the procedure moves on to S813, and in a case where the update of the camera parameter has not been permitted (S809/No), the calibration processing unit 147 ends the procedure.

In the case where the update of the camera parameter has been permitted (S809/Yes), the calibration processing unit 147 updates at least one of the plurality of cameras 110 with the camera parameter obtained by the calibration process. The calibration processing unit 147 ends the procedure.

Note that the camera parameter update may be permitted in any method, but, for example, the operation control unit 159 may cause the display 20 included in the moving body 5 to display a notification screen related to the camera parameter update permission.

Figure 14:
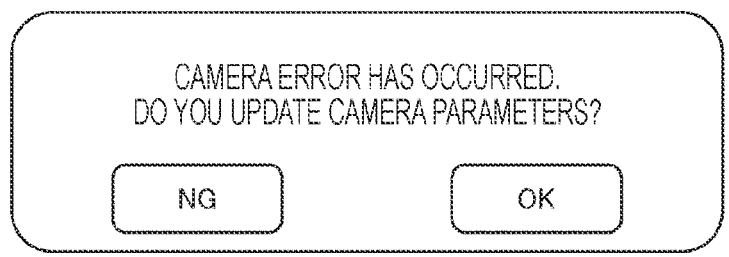
FIG. 14 is an explanatory diagram explaining an example of a display screen related to camera parameter update permission.

FIG. 14 is an explanatory diagram explaining an example of a display screen related to the camera parameter update permission. For example, the operation control unit 159 may cause the display 20 to display such a notification screen related to the update of the camera parameter as illustrated in FIG. 14. In a case where the user selects "OK" or "NG" on the display 20, then the calibration processing unit 147 can determine whether or not the update of the camera parameter has been permitted.

Note that FIG. 14 is an example of a method for acquiring permission to update the camera parameter, and the method for acquiring update permission according to the present disclosure is not limited to such an example. For example, the operation control unit 159 may cause a speaker included in the moving body 5 to output a sound related to permission to update the camera parameter.

Furthermore, the calibration processing unit 147 may determine whether or not the update of the camera parameter has been permitted, on the basis of a word (for example, "yes" or "no") uttered by the user.

Furthermore, in a case where the user has not permitted the update, the operation control unit 159 may disable control related to a predetermined operation of the operation apparatus 30. For example, the operation control unit 159 may disable various functions to be executed by the distance measurement data utilization unit 155. More specifically, the operation control unit 159 may disable, for example, a function related to automated driving of the moving body 5, and a function related to obstacle avoidance.

Up to this point the example of operation processing of the third modification according to the present disclosure has been described. Next, an example of operation processing of a fourth modification according to the present disclosure is described with reference to FIG. 14.

<<4.4. Fourth Modification>>

The operation control unit 159 according to the present disclosure may output control information related to the travel of the moving body 5 in a case where the calibration processing unit 147 determines that the cameras' respective images are not images suitable for the calibration process.

Figure 15:
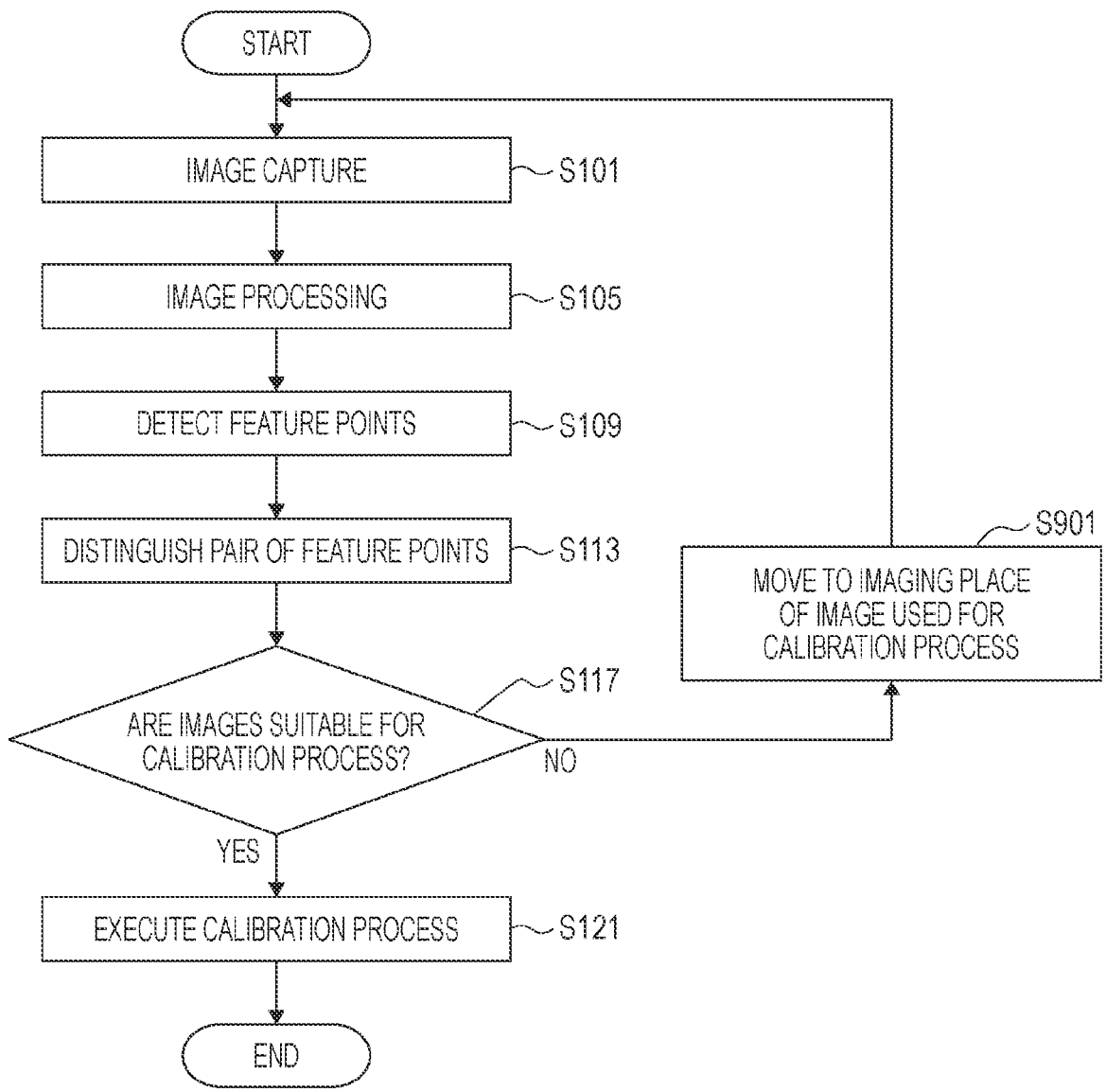
FIG. 15 is an explanatory diagram explaining an example of operation processing according to a fourth modification.

FIG. 15 is an explanatory diagram explaining an example of operation processing according to the fourth modification. The procedure of S101 to S121 is described with reference to FIG. 4. Therefore, a description thereof is omitted in FIG. 15.

In a case where it is determined that the cameras' respective images are not images suitable for the calibration process (S117/No), the operation control unit 159 moves the moving body 5 to an imaging place where images suitable for the calibration process can be acquired (S901).

The procedure of S101 to S117 and S901 is then repeatedly performed until the calibration processing unit 147 determines in S117 that the images are suitable for the calibration process.

For example, the operation control unit 159 may control the travel of the moving body 5 toward a location suitable for the calibration process. More specifically, in a case where the moving body 5 is a drone, the operation control unit 159 may perform control related to ascent or descent of the drone.

Furthermore, the operation control unit 159 may acquire location information where images suitable for the calibration process can be acquired, and in a case where it is determined that the moving body 5 can move to a location indicated by the location information, the operation control unit 169 may move the moving body 5 to the point indicated by the location information.

Furthermore, the operation control unit 159 may keep moving the moving body 5 until the luminance value of each pixel of the cameras' respective images obtained by being captured by the plurality of cameras 110 satisfies a predetermined standard. For example, the luminance value of each pixel satisfying the predetermined standard may mean, for example, that an average luminance value may be equal to or greater than a predetermined value, the average luminance value may be within a predetermined range, or the standard deviation or variance of the luminance values of all the pixels may be equal to or greater than a predetermined value.

Furthermore, the operation control unit 159 may cause the display 20 to display location information suitable for the calibration process. Therefore, the user can move the moving body 5 in accordance with the location information displayed on the display 20.

Up to this point the example of operation processing of the fourth modification according to the present disclosure has been described. Next, an example of operation processing of a fifth modification according to the present disclosure is described with reference to FIG. 15.

<<4.5. Fifth Modification>>

The information processing apparatus 10 according to the present disclosure may determine whether or not a failure that is difficult to be improved by updating the camera parameter has occurred in the cameras, according to the variation of the camera parameter.

For example, the storage unit 120 stores the camera parameter obtained by calibration. In a case where a difference between the camera parameter calculated by calibration and a past camera parameter stored in the storage unit 120 is equal to or greater than a predetermined value, then the calibration processing unit 147 may determine that a failure that is difficult to be improved by updating the camera parameter has occurred in the plurality of cameras 119.

Figure 16:
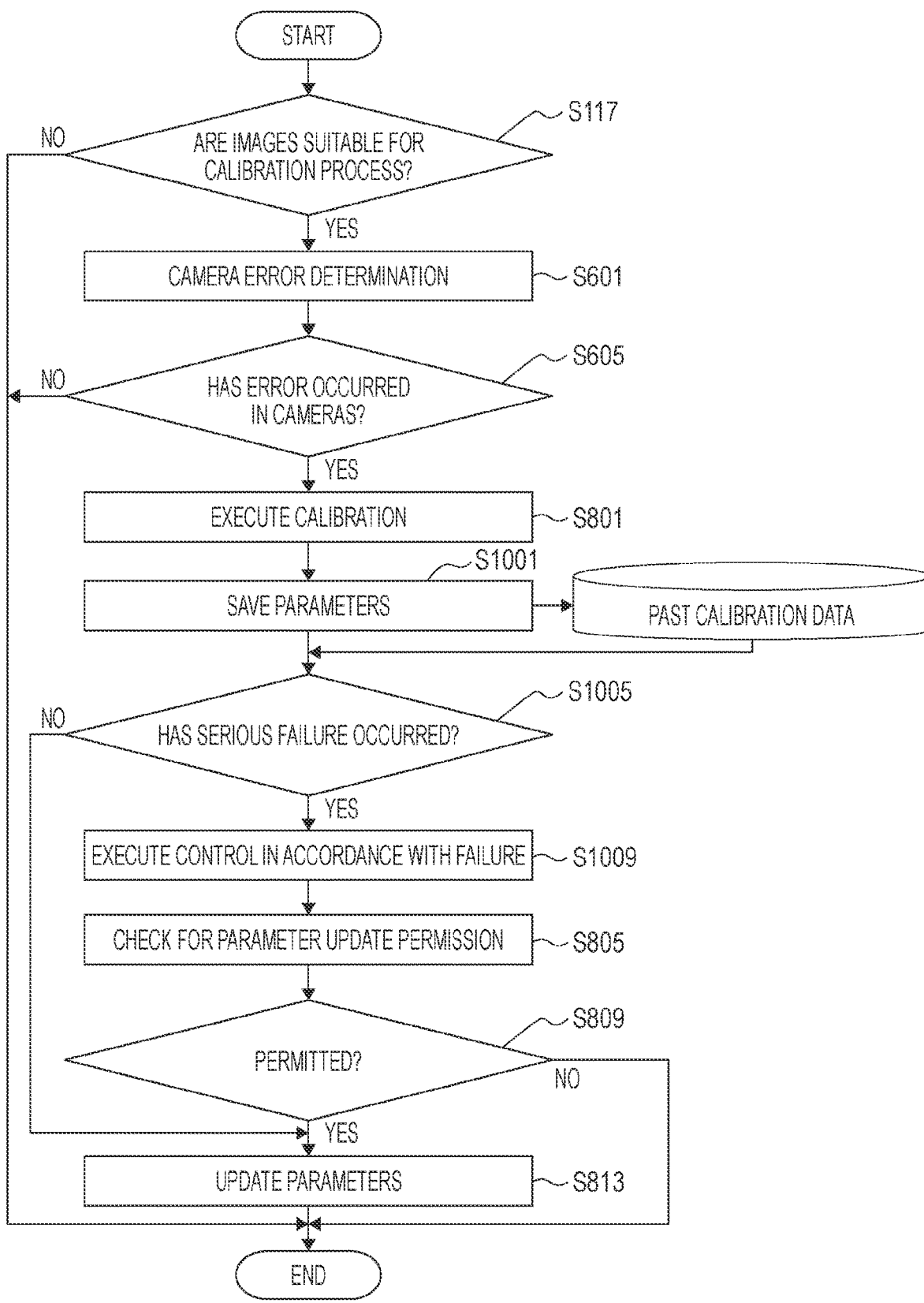
FIG. 16 is an explanatory diagram explaining an example of operation processing according to a fifth modification.

FIG. 16 is an explanatory diagram explaining an example of operation processing according to the fifth modification. The procedure except S1001 to S1009 overlaps with the description of FIG. 13 and thus a description thereof is omitted.

After the calibration processing unit 147 executes the calibration process (S801), the storage unit 120 saves the camera parameter obtained by the calibration process.

The calibration processing unit 147 then determines whether or not a serious failure has occurred in the plurality of cameras on the basis of a past camera parameter and the camera parameter obtained in S801 (S1005). In a case where it is determined that a serious failure has occurred (S1005/Yes), the procedure moves on to S1009, and in a case where it is determined that no serious failure has occurred (S1005/No), the procedure moves on to S805.

In the case where it is determined that a serious failure has occurred (S1005/Yes), the operation control unit 159 executes control in accordance with the failure (S1009), and the procedure moves on to S805.

Note that, for example, the operation control unit 159 may cause the display 20 to display a display that prompts the repair of the plurality of cameras, or may turn on a warning light.

Furthermore, the operation control unit 159 may switch the control related to the distance measuring unit 151 and the distance measurement data utilization unit 155 to disable. For example, in a case where the moving body 5 is an automobile, the operation control unit 159 may switch an automated driving function to disable. Furthermore, in a case where the moving body 5 is a drone, the operation control unit 159 may switch an obstacle avoidance function based on distance measurement to disable.

Furthermore, the calibration processing unit 147 may acquire a difference in variations of each element, the focal length, the optical center, the rotation component (pitch, yaw, roll), or the translation component (x, y, z) of the past camera parameter held in the storage unit 120 and, for example, in a case where an average value, deviation, or standard deviation exceeds a predetermined value, determine that a failure has occurred in the plurality of cameras 110.

Furthermore, the calibration processing unit 147 may determine that a failure has occurred in the plurality of cameras 110 in a case where the number of times the difference in the change of each of the rotation component and the translation component is displaced in the same direction exceeds a predetermined number of times.

Furthermore, the calibration processing unit 147 may determine that a failure has occurred in the plurality of cameras 110 in a case where the number of times a difference between the latest camera parameter and the previous camera parameter is equal to or greater than a predetermined value exceeds a predetermined number of times.

Up to this point the modifications of the operation processing according to the present disclosure have been described. Next, examples of operations and effects according to the present disclosure are described.

<5. Examples of Operations and Effects>

According to the present disclosure described above, various operations and effects can be obtained. For example, the calibration processing unit 147 can set the camera parameter calculated with higher accuracy in the camera by executing the process of calibrating the camera by use of the cameras' respective images having feature points that satisfy the predetermined condition.

Furthermore, the calibration processing unit 147 executes the process of calibrating the camera by use of the cameras' respective images in which a displacement between the cameras is calculated and resulted in being equal to or greater than the predetermined value. The calibration processing unit 147 can reduce a load on the information processing apparatus 10 by not executing the calibration process unnecessarily.

Furthermore, the calibration processing unit 147 executes the process of calibrating the camera by use of the plurality of the cameras' respective images held in the storage unit 120. Therefore, the calibration processing unit 147 can reduce the possibility of occurrence of a calibration calculation error due to, for example, noise, and calculate the camera parameter with higher accuracy.

Furthermore, the calibration processing unit 147 executes the calibration process on the plurality of cameras in a case where a user permits the update of the camera parameter. Therefore, the information processing apparatus 10 can control the timing to update the camera parameter in accordance with the situation of the moving body 5, and can further increase the convenience of the user.

Furthermore, the operation control unit 159 performs control related to the travel of the moving body 5 on which the plurality of cameras 110 is mounted. Therefore, the plurality of cameras 110 can acquire images suitable for the calibration process with higher accuracy.

Furthermore, the storage unit 120 holds the cameras' respective images determined that an error has occurred in the plurality of cameras 110. Therefore, it is possible to restrain the images from taking up so much storage space since the storage unit 120 holds only necessary images.

Furthermore, in a case where the camera parameter before and after the calibration process satisfies the predetermined standard, the operation control unit 159 disables control related to a predetermined operation of the moving body 5. Therefore, a risk such as the collision of the moving body 5 with an obstacle can be reduced.

Up to this point the examples of the operations and effects according to the present disclosure have been described. Next, an example of the configuration of hardware according to the present disclosure is described with reference to FIG. 17.

<6. Hardware Configuration Example>

Up to this point the embodiment of the present disclosure has been described. Each kind of information processing such as the above-mentioned feature point detection or calibration process is realized by cooperation between software and hardware of the information processing apparatus 10, the hardware being described below.

Figure 17:
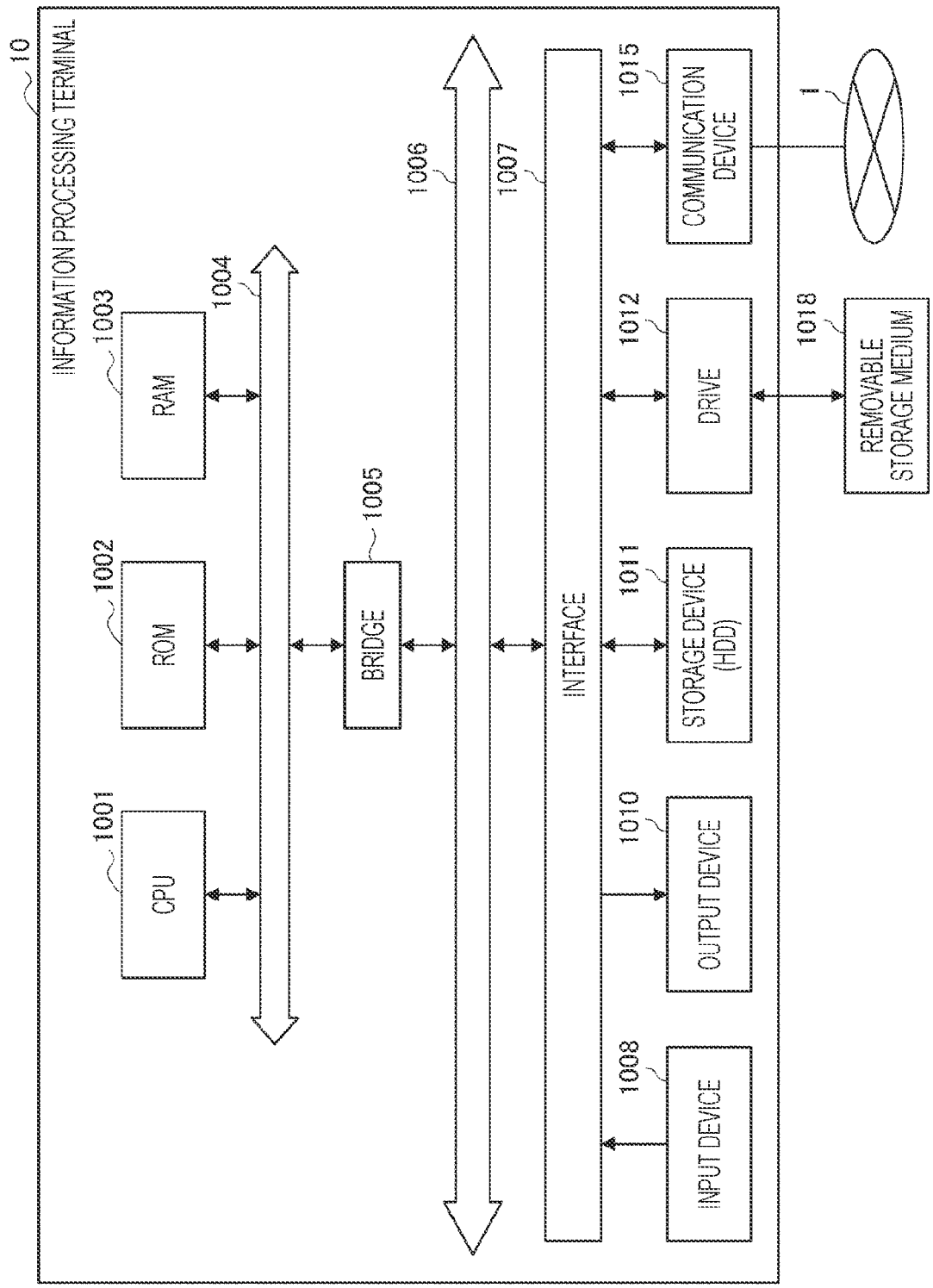
FIG. 17 is a block diagram illustrating the configuration of hardware of the information processing apparatus 10.

FIG. 17 is a block diagram illustrating the configuration of hardware of the information processing apparatus 10. The information processing apparatus 10 includes a central processing unit (CPU) 1001, a read only memory (ROM) 1002, a random access memory (RAM) 1003, and a host bus 1004. Furthermore, the information processing apparatus 10 includes a bridge 1005, an external bus 1006, an interface 1007, an input device 1008, an output device 1010, a storage device (HDD) 1011, a drive 1012, and a communication device 1015.

The CPU 1001 functions as an arithmetic processing device and a control device, and controls the overall operation in the information processing apparatus 10 in accordance with various programs. Furthermore, the CPU 1001 may be a microprocessor. The ROM 1002 stores, for example, programs and operation parameters that are used by the CPU 1001. The RAM 1003 temporarily stores, for example, the programs used during execution of the CPU 1001, and parameters that change as appropriate during the execution. They are connected to each other by the host bus 1004 including a CPU bus. Functions of, for example, the feature point detection unit 135, the distinguishing unit 139, and the calibration processing unit 147, which are described with reference to FIG. 2, can be realized by cooperation between the CPU 1001, the ROM 1002, and the RAM 1003 and software.

The host bus 1004 is connected to the external bus 1006 such as a peripheral component interconnect/interface (PCI) bus via the bridge 1005. Note that the host bus 1004, the bridge 1005, and the external bus 1006 are not necessarily configured separately, and functions thereof may be mounted on one bus.

The input device 1008 includes an input unit for allowing a user to input information, such as a mouse, a keyboard, a touch panel, a button, a microphone, a switch, and a lever, and an input control circuit that generates an input signal on the basis of an input by the user, and outputs the input signal to the CPU 1001. By operating the input device 1008, the user of the information processing apparatus 10 can input various data into the information processing apparatus 10, or instruct the information processing apparatus 10 to perform a processing operation.

For example, the output device 1010 includes display devices such as a liquid crystal display device, an OLED device, and a lamp. Moreover, the output device 1010 includes audio output devices such as a speaker and headphones. The output device 1010 outputs, for example, a reproduced content. Specifically, the display device displays various kinds of information such as reproduced video data as text or images. On the other hand, the audio output device converts, for example, reproduced audio data into audio and outputs the audio.

The storage device 1011 is a device for storing data. The storage device 1011 may include a storage medium, a recording device that records data in the storage medium, a reading device that reads data from the storage medium, and a deletion device that deletes data recorded on the storage medium. For example, the storage device 1011 includes a hard disk drive (HDD). The storage device 1011 drives a hard disk and stores programs to be executed by the CPU 1001 and various data.

The drive 1012 is a reader-writer for a storage medium, and is built in or externally attached to the information processing apparatus 10. The drive 1012 reads out information recorded in a removable storage medium 1018 mounted thereon, such as a magnetic disc, an optical disc, a magneto-optical disc, or a semiconductor memory, and outputs the information to the RAM 1003. Furthermore, the drive 1012 can also write information on the removable storage medium 1018.

The communication device 1015 is, for example, a communication interface including a communication device for connection to a network 12. Furthermore, the communication device 1015 may be a wireless LAN capable communication device, a long term evolution (LTE) capable communication device, or a wire communication device that performs wired communication.

Up to this point the hardware configuration example according to the present disclosure has been described. Next, a supplement according to the present disclosure is described.

<7. Supplement>

Up to this point the preferred embodiment of the present disclosure has been described in detail with reference to the accompanying drawings. However, the present disclosure is not limited to such examples. It is apparent that a person having ordinary knowledge in the technical field to which the present disclosure belongs can devise various change examples or amendment examples within the scope of the technical idea described in the claims, and it will be naturally understood that they also belong to the technical scope of the present disclosure.

For example, each step in the processing of the information processing apparatus 10 of the present description is not necessarily performed in time series in the orders described in the flowcharts. For example, the each step in the processing of the information processing apparatus 10 may be performed in orders different from the orders described in the flowcharts, or may be performed in parallel.

Furthermore, it is also possible to create a computer program for causing hardware built in the information processing apparatus 10, such as a CPU, a ROM, and a RAM, to exhibit a function equivalent to each configuration of the above-mentioned information processing apparatus 10. Furthermore, a storage medium storing the computer program is also provided.

Furthermore, the effects described in the present description are merely explanatory or illustrative, and are not restrictive. In other words, the technology according to the present disclosure can exhibit other effects that are apparent to those skilled in the art from the description of the present description, in addition to, or instead of, the above effects.

Note that the following configurations also belong to the technical scope of the present disclosure.

(1)

An information processing apparatus including:
  a detection unit configured to detect a feature point from each of images obtained by imaging a subject with a plurality of cameras respectively at a certain timing; and
  a processing unit configured to execute a process of calibrating at least one of the plurality of cameras by use of the cameras' respective images having the feature point detected by the detection unit, the feature point satisfying a predetermined condition.

(2)

The information processing apparatus according to (1), in which
  the processing unit
  executes the process of calibrating at least one of the plurality of cameras by use of the cameras' respective images having a number of the feature points detected by the detection unit, the number being equal to or greater than a predetermined value.

(3)

The information processing apparatus according to (1) or (2), further including
  a distinguishing unit configured to, for each feature point included in one image detected by the detection unit, distinguish a feature point having a highest correlation among feature points included in the other image as a pair of feature points, in which
  the processing unit
  executes the process of calibrating at least one of the plurality of cameras by use of the cameras' respective images having the pair of feature points that satisfies a predetermined condition.

(4)

The information processing apparatus according to (3), in which
  the processing unit
  executes the process of calibrating at least one of the plurality of cameras by use of the cameras' respective images having a number of the pairs of feature points, the number being equal to or greater than a predetermined value.

(5)

The information processing apparatus according to (3) or (4), in which
  the processing unit
  executes the process of calibrating at least one of the plurality of cameras by use of the cameras' respective images having a distribution of disparity values obtained for each pair of feature points distinguished by the distinguishing unit, the distribution satisfying a predetermined standard.

(6) The information processing apparatus according to any of (3) to (5), in which
the processing unit
executes the process of calibrating at least one of the plurality of cameras by use of the cameras' respective images having a distribution of feature points distinguished as a pair of feature points by the distinguishing unit, the distribution satisfying a predetermined standard.

(7) The information processing apparatus according to any of (1) to (6), further including
a calculation unit configured to calculate a displacement between the plurality of cameras on the basis of a rectification process executed on the cameras' respective images, in which
the processing unit
executes the process of calibrating at least one of the plurality of cameras by use of the cameras' respective images having a result of calculation by the calculation unit, the result being that the displacement between the plurality of cameras is equal to or greater than a predetermined value.

(8) The information processing apparatus according to (7), further including
a storage unit configured to store the cameras' respective images having a result of calculation by the calculation unit, the result being that the displacement between the plurality of cameras is equal to or greater than the predetermined value, in which
the processing unit
executes the process of calibrating at least one of the plurality of cameras by use of a predetermined number of the cameras' respective images having a new imaging time among the cameras' respective images stored in the storage unit.

(9) The information processing apparatus according to (8), in which
the processing unit
executes the process of calibrating at least one of the plurality of cameras by use of a predetermined number of the cameras' respective images stored in the storage unit upon the predetermined number or more of the cameras' respective images being stored in the storage unit after a point in time of previous calibration.

(10) The information processing apparatus according to any of (1) to (9), in which
the processing unit
executes the process of calibrating at least one of the plurality of cameras upon calibration execution permission being obtained in response to an operation by a user.

(11) The information processing apparatus according to any of (1) to (10), further including
an operation control unit configured to output control information related to travel of a moving body on which the plurality of cameras is mounted, in which
the processing unit
executes the process of calibrating at least one of the plurality of cameras by use of the cameras' respective images obtained by being captured by the plurality of cameras after the moving body moves in accordance with the control information.

(12) The information processing apparatus according to (11), in which
the travel control unit
moves the moving body on which the plurality of cameras is mounted to a certain target location.

(13) The information processing apparatus according to (11), in which
the travel control unit
causes a display mounted on the moving body to display guidance information regarding travel of the moving body from a current location to a target location.

(14) The information processing apparatus according to any of (11) to (13), in which
the operation control unit
disables control related to a predetermined operation of the moving body upon a difference between a post-calibration parameter and a pre-calibration parameter of at least one of the plurality of cameras calibrated by the processing unit satisfying a predetermined standard.

(15) The information processing apparatus according to any of (1) to (14), in which
the processing unit
calibrates the plurality of cameras by use of the cameras' respective images where the feature point detected by the detection unit satisfies a predetermined condition.

(16) An information processing method to be executed by a computer, the method including:
detecting a feature point from each of images obtained by imaging a subject with a plurality of cameras respectively at a certain timing; and
executing a process of calibrating at least one of the plurality of cameras by use of the cameras' respective images having the detected feature point that satisfies a predetermined condition.

(17) A program causing a computer to realize:
a detection function of detecting a feature point from each of images obtained by imaging a subject with a plurality of cameras respectively at a certain timing; and
a processing function of executing a process of calibrating at least one of the plurality of cameras by use of the cameras' respective images having the feature point detected by the detection function, the feature point satisfying a predetermined condition.

REFERENCE SIGNS LIST

5 Moving body
10 Information processing apparatus
110 Camera
120 Storage unit
130 Control unit
131 Image processing unit
135 Feature point detection unit
139 Distinguishing unit
143 Score calculation unit
147 Calibration processing unit 151 Distance measuring unit
155 Distance measurement data utilization unit
159 Operation control unit
20 Display
30 Operation apparatus

The invention claimed is:

1. An information processing apparatus comprising:
   circuitry configured to
   detect a feature point from each image of a plurality of images obtained by imaging a subject with a plurality of cameras respectively at a certain timing, and
   execute a process of calibrating at least one of the plurality of cameras by use of respective images of the plurality of cameras having the detected feature point, the feature point satisfying a predetermined condition,
   wherein the predetermined condition is based on a calculated degree of correlation of the detected feature point among the respective images of the plurality of cameras, and
   wherein the circuitry executes the process of calibrating the at least one of the plurality of cameras by use of respective images of the plurality of cameras having a distribution of disparity values for which a calculated disparity distribution score is equal to or greater than a predetermined value.

2. The information processing apparatus according to claim 1,
   wherein the circuitry executes the process of calibrating the at least one of the plurality of cameras by use of the respective images of the plurality of cameras having a number of detected feature points, the number being equal to or greater than a predetermined value.

3. The information processing apparatus according to claim 2,
   wherein the circuitry is further configured to distinguish, for each detected feature point included in a first image, a feature point having a highest correlation among feature points included in a second image as a pair of feature points, and
   wherein the circuitry executes the process of calibrating the at least one of the plurality of cameras by use of the respective images of the plurality of cameras having the pair of feature points that satisfies a predetermined condition.

4. The information processing apparatus according to claim 3,
   wherein the circuitry executes the process of calibrating the at least one of the plurality of cameras by use of the respective images of the plurality of cameras having a number of the pairs of feature points, the number being equal to or greater than a predetermined value.

5. The information processing apparatus according to claim 4,
   wherein the circuitry executes the process of calibrating the at least one of the plurality of cameras by use of the respective images of the plurality of cameras having the distribution of disparity values obtained for each pair of feature points with the calculated disparity distribution score equal to or greater than the predetermined value.

6. The information processing apparatus according to claim 5,
   wherein the circuitry executes the process of calibrating the at least one of the plurality of cameras by use of the respective images of the plurality of cameras having a predetermined distribution of feature points for each pair of feature points.

7. The information processing apparatus according to claim 6,
   wherein the circuitry is further configured to calculate a displacement between the plurality of cameras based on a rectification process executed on the respective images of the plurality of cameras, and
   wherein the circuitry executes the process of calibrating the at least one of the plurality of cameras by use of the respective images of the plurality of cameras having a result of calculation indicating that the displacement between the plurality of cameras is equal to or greater than a predetermined value.

8. The information processing apparatus according to claim 7, further comprising:
   a non-transitory computer-readable storage medium configured to store the respective images of the plurality of cameras having a result of calculation, the result being that the displacement between the plurality of cameras is equal to or greater than the predetermined value,
   wherein the circuitry executes the process of calibrating the at least one of the plurality of cameras by use of a predetermined number of the respective images of the plurality of cameras having a new imaging time among the respective images of the plurality of cameras stored in the non-transitory computer-readable storage medium.

9. The information processing apparatus according to claim 8,
   wherein the circuitry executes the process of calibrating the at least one of the plurality of cameras by use of a predetermined number of the respective images of the plurality of cameras stored in the non-transitory computer-readable storage medium upon the predetermined number or more of the respective images of the plurality of cameras being stored in the non-transitory computer-readable storage medium after a point in time of previous calibration.

10. The information processing apparatus according to claim 9,
    wherein the circuitry executes the process of calibrating the at least one of the plurality of cameras upon calibration execution permission being obtained in response to an operation by a user.

11. The information processing apparatus according to claim 10,
    wherein the circuitry is further configured to output control information related to travel of a moving body on which the plurality of cameras is mounted, and
    wherein the circuitry executes the process of calibrating the at least one of the plurality of cameras by use of the respective images of the plurality of cameras obtained by being captured by the plurality of cameras after the moving body moves in accordance with the control information.

12. The information processing apparatus according to claim 11,
    wherein the circuitry outputs the control information to move the moving body on which the plurality of cameras is mounted to a certain target location.

13. The information processing apparatus according to claim 11,
    wherein the circuitry is further configured to control a display mounted on the moving body to display guidance information regarding the travel of the moving body from a current location to a target location.

14. The information processing apparatus according to claim 13, wherein the circuitry is further configured to disable control related to a predetermined operation of the moving body when a difference between a post-calibration parameter and a pre-calibration parameter of at least one of the plurality of cameras calibrated by the circuitry is equal to or greater than a predetermined value.

15. The information processing apparatus according to claim 14,
wherein the circuitry calibrates the plurality of cameras by use of the respective images of the plurality of cameras where the detected feature point satisfies the predetermined condition.

16. An information processing method to be executed by a computer, the method comprising:
   detecting a feature point from each image of a plurality of images obtained by imaging a subject with a plurality of cameras respectively at a certain timing; and
   executing a process of calibrating at least one of the plurality of cameras by use of respective images of the plurality of cameras having the detected feature point that satisfies a predetermined condition,
   wherein the predetermined condition is based on a calculated degree of correlation of the detected feature point among the respective images of the plurality of cameras, and
   wherein the process of calibrating the at least one of the plurality of cameras is executed by use of respective images of the plurality of cameras having a distribution of disparity values for which a calculated disparity distribution score is equal to or greater than a predetermined value.

17. A non-transitory computer-readable storage medium having embodied thereon a program, which when executed by a computer causes the computer to execute a method, the method comprising:
   detecting a feature point from each image of a plurality of images obtained by imaging a subject with a plurality of cameras respectively at a certain timing; and
   executing a process of calibrating at least one of the plurality of cameras by use of respective images of the plurality of cameras having the detected feature point, the feature point satisfying a predetermined condition,
   wherein the predetermined condition is based on a calculated degree of correlation of the detected feature point among the respective images of the plurality of cameras, and
   wherein the process of calibrating the at least one of the plurality of cameras is executed by use of respective images of the plurality of cameras having a distribution of disparity values for which a calculated disparity distribution score is equal to or greater than a predetermined value.

* * * * *